(12) United States Patent
Ueno et al.

(10) Patent No.: US 9,128,774 B2
(45) Date of Patent: Sep. 8, 2015

(54) INFORMATION PROCESSING SYSTEM FOR DATA TRANSFER

(71) Applicant: FUJITSU LIMITED, Kawasaki-shi (JP)

(72) Inventors: Hitoshi Ueno, Kawasaki (JP); Masaaki Takase, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 344 days.

(21) Appl. No.: 13/649,160

(22) Filed: Oct. 11, 2012

(65) Prior Publication Data

US 2013/0167153 A1  Jun. 27, 2013

(30) Foreign Application Priority Data

Dec. 21, 2011  (JP) ................. 2011-280559

(51) Int. Cl.
*G06F 9/46* (2006.01)
*G06F 9/50* (2006.01)
*H04L 29/08* (2006.01)

(52) U.S. Cl.
CPC ............... *G06F 9/5083* (2013.01); *G06F 9/50* (2013.01); *G06F 9/505* (2013.01); *G06F 9/5005* (2013.01); *G06F 2209/5022* (2013.01); *H04L 67/1008* (2013.01)

(58) Field of Classification Search
None
See application file for complete search history.

(56) References Cited

U.S. PATENT DOCUMENTS

| | | | | |
|---|---|---|---|---|
| 5,923,875 A | * | 7/1999 | Tabuchi | 718/105 |
| 6,026,425 A | * | 2/2000 | Suguri et al. | 718/105 |
| 8,490,104 B2 | * | 7/2013 | Iino et al. | 718/104 |
| 2003/0145109 A1 | | 7/2003 | Nakashima | |
| 2005/0102427 A1 | | 5/2005 | Yokota et al. | |
| 2010/0185766 A1 | * | 7/2010 | Sano et al. | 709/226 |

FOREIGN PATENT DOCUMENTS

| | | |
|---|---|---|
| JP | 9-064871 | 3/1997 |
| JP | 2000-010936 | 1/2000 |
| JP | 2001-282642 | 10/2001 |
| JP | 2003-218916 A2 | 7/2003 |
| JP | 2004-70860 A1 | 3/2004 |

OTHER PUBLICATIONS

Japanese Office Action mailed May 12, 2015 for corresponding Japanese Patent Application 2011-280559, with Partial English Translation, 3 pages.

* cited by examiner

*Primary Examiner* — Kenneth Tang
(74) *Attorney, Agent, or Firm* — Fujitsu Patent Center

(57) ABSTRACT

A disclosed method includes: determining whether a value of a load caused by a transfer processing to transmit data received from first processing apparatuses to second processing apparatuses in response to a request from the second processing apparatuses exceeds a threshold; upon determining that the value of the load exceeds the threshold, counting, for each first processing apparatus, the number of second processing apparatuses that request data transmitted by the first processing apparatus; identifying a first processing apparatus that is a transmission source of data transferred in the transfer processing to be allocated to another transfer apparatus of plural transfer apparatuses, based on the counted number; and transmitting a change request requesting that the transfer processing of data transmitted by the identified first processing apparatus is to be allocated to the another transfer apparatus, to a management apparatus managing allocation of the transfer processing for the plural transfer apparatuses.

8 Claims, 22 Drawing Sheets

| AGENT | AVERAGE LOAD | LOAD FLUCTUATION | STATUS |
|---|---|---|---|
| 1 | 20 | LARGE | PROCESSING IN PROGRESS |
| 2 | 40 | SMALL | PROCESSING IN PROGRESS |
| 3 | 20 | SMALL | CHANGE IS POSSIBLE |
| 4 | 20 | SMALL | CHANGE IS POSSIBLE |

FIG.3

| COLLECTION APPLICATION | VM DATA |
|---|---|
| 1 | * * * * * |
| 2 | * * * * * |
| 3 | * * * * * |

FIG.4

| COLLECTION APPLICATION | REQUESTING VM |
|---|---|
| 1 | 1, 30, 33 |
| 2 | 1, 30, 35 |
| 3 | 2, 65 |

FIG.5

| AGENT | ALLOCATED VM |
|---|---|
| 1 | 1-10 |
| 2 | 11-30 |
| 3 | 31-60 |
| 4 | 61-80 |

FIG.6

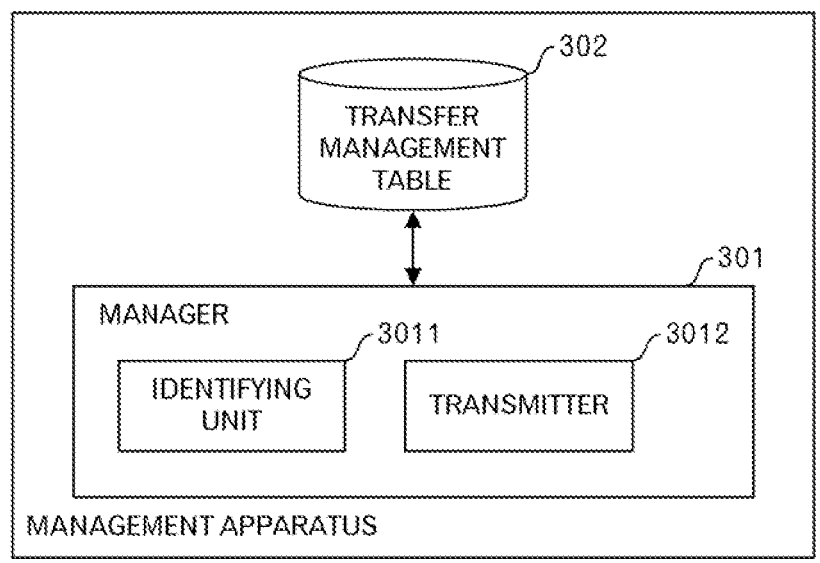
FIG.7
| TRANSFER APPARATUS | LOAD | IP ADDRESS |
|---|---|---|
| 1 | 80 | 192.168.10.1 |
| 2 | 30 | 192.168.10.2 |
| 3 | 20 | 192.168.10.3 |
FIG.8
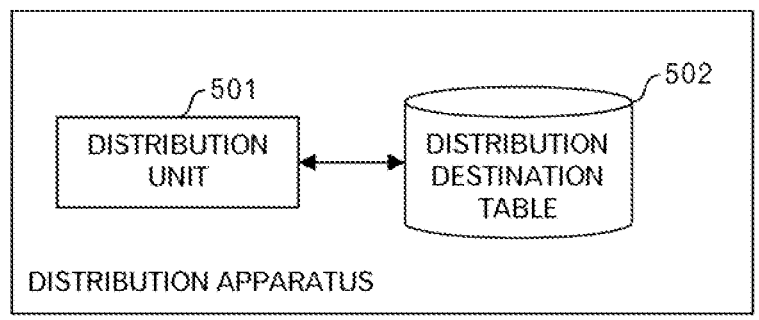
FIG.9

| SESSION ID | IP ADDRESS OF TRANSFER APPARATUS |
|---|---|
| aasbbh | 192.168.10.1 |
| bbtcci | 192.168.10.2 |
| ccuddj | 192.168.10.3 |
| ddveek | 192.168.10.4 |
FIG.10
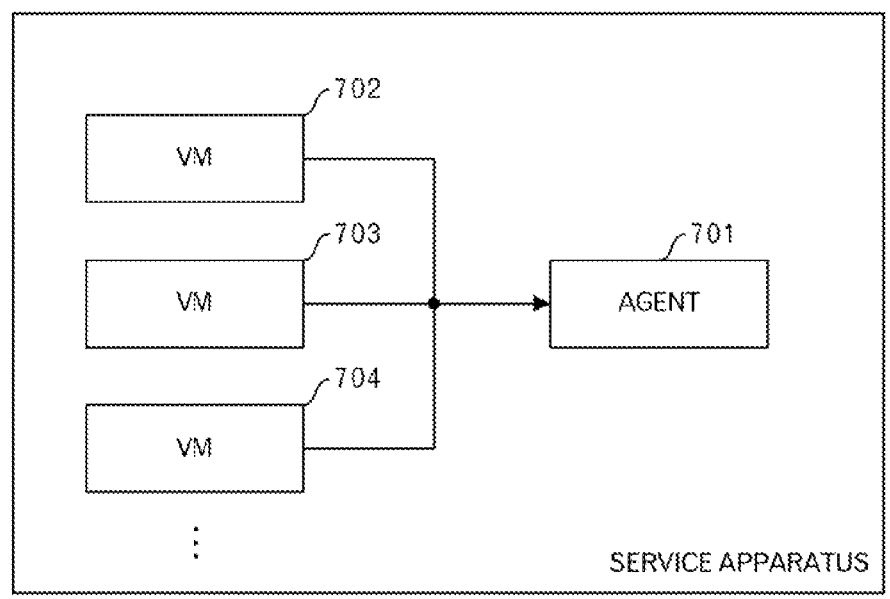
FIG.11
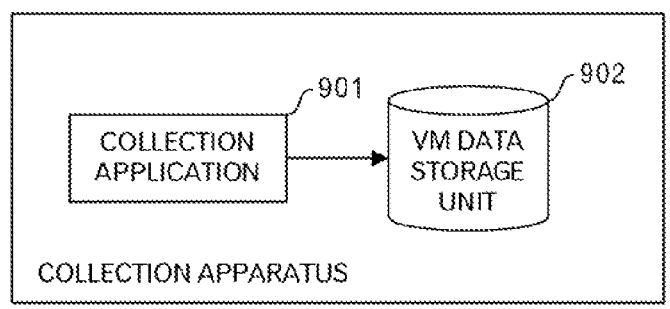
FIG.12

```
POST /vmdata
Cookie: sessionid=aasbbh

<common>
  <agentid>1</agentid>
</common>

<vmdata id=1>
  <cpu usage>34</cpu usage>
  <network..

</vmdata>

<vmdata id=2>
  <cpu usage>...
</vmdata>

<vmdata id=3>

⋮
```

| AGENT | NO. OF COLLECTION APPLICATIONS |
|---|---|
| 3 | 2 |
| 4 | 1 |
| 3,4 | 3 |

| AGENT | ALLOCATION DESTINATION TRANSFER APPARATUS |
|---|---|
| 4 | 192.168.10.4 |

INFORMATION PROCESSING SYSTEM FOR DATA TRANSFER

CROSS-REFERENCE TO RELATED APPLICATIONS

This application is based upon and claims the benefit of priority of the prior Japanese Patent Application No. 2011-280559, filed on Dec. 21, 2011, the entire contents of which are incorporated herein by reference.

FIELD

This technique relates to a load balancing technique in an information processing system.

BACKGROUND

There are systems in which plural computers share and execute a processing. In such systems, changing allocations of processing during operation of the system may occur for the purpose of load balancing and the like.

Conventionally, in order to prevent a specific apparatus from being overloaded, there has been a technique for changing an apparatus that carries out the processing. More specifically, in a network in which plural managed apparatuses and plural management apparatuses are connected, each management apparatus counts the number of notifications from managed apparatuses that it manages per unit time for each managed apparatus. When the number of notifications becomes equal to or greater than a preset value, the management apparatus sends information regarding a management apparatus that will become a new notification destination to the managed apparatus, based on a management apparatus table that stores information about other management apparatuses. As a result, the load due to the processing that the management apparatus was originally supposed to carry out, or in other words, the processing caused by notifications from the managed apparatuses, is distributed.

Incidentally, when changing the allocation of the processing, in addition to the load due to the processing that was originally to be carried out, there is a load that occurs due to the processing to ensure that the processing after the allocation has been changed is carried out with no problems. For example, in the technique described above, a load occurs in the management apparatus due to the processing such as a processing carried out by the management apparatus to send information regarding the new destination management apparatus to the managed apparatuses.

On the other hand, there is a system in which information about the allocation destinations is not sent to apparatuses that will be affected by a change in allocations, when the allocation of the processing has been changed. In such a system, an apparatus that is affected by a change in allocations itself makes an inquiry for new allocation destination information to the system, and a load occurs in the system by handling such an inquiry. In the conventional techniques, reducing the loads that occur in the system when the allocations of the processing have been changed was not taken into consideration.

Namely, according to the conventional techniques, in a system that carries out and shares a processing by plural apparatuses, a load that occurs in the system when the allocations of the processing have been changed cannot be reduced.

SUMMARY

An information processing system relating to a first aspect of this technique includes: (A) a plurality of transfer apparatuses, each of which carries out a transfer processing to transmit data received from one or plural first processing apparatuses to one or plural second processing apparatuses in response to a request from the one or plural second processing apparatuses; and (B) a management apparatus managing allocation of the transfer processing for the plurality of transfer apparatuses. Then, each transfer apparatus of the plurality of transfer apparatuses includes: a first memory, and a first processor using the first memory and configured to execute a first procedure including: (a1) determining whether a value of a load caused by the transfer processing carried out by the transfer apparatus exceeds a first threshold; (a2) upon determining that the value of the load exceeds the first threshold, counting, for each first processing apparatus of the one or plural first processing apparatuses, the number of second processing apparatuses that request data transmitted by the first processing apparatus; (a3) first identifying a first processing apparatus that is a transmission source of data transferred in the transfer processing to be allocated to another transfer apparatus among the plurality of transfer apparatuses, based on the counted number; and (a4) first transmitting a change request requesting that the transfer processing of data transmitted by the identified first processing apparatus is to be allocated to the another transfer apparatus among the plurality of transfer apparatuses, to the management apparatus. Moreover, the management apparatus includes: a second memory; and a second processor using the second memory and configured to execute a second procedure including: (b1) upon receipt of the change request, second identifying, from among the plurality of transfer apparatuses, another transfer apparatus that will carry out the transfer processing of the data transmitted by the identified first processing apparatus on behalf of a transfer apparatus that is a transmission source of the change request; and (b2) upon receipt of an inquiry about a request destination of the data transmitted by the identified first processing apparatus from a second processing apparatus that requests the data, second transmitting identification information of the identified another transfer apparatus to the second processing apparatus.

An information processing method relating to a second aspect of this technique includes: (C) determining whether a value of a load caused by a transfer processing to transmit data received from one or plural first processing apparatuses to one or plural second processing apparatuses in response to a request from the one or plural second processing apparatuses exceeds a first threshold; (D) upon determining that the value of the load exceeds the first threshold, counting, for each first processing apparatus of the one or plural first processing apparatuses, the number of second processing apparatuses that request data transmitted by the first processing apparatus; (E) identifying a first processing apparatus that is a transmission source of data transferred in the transfer processing to be allocated to another transfer apparatus among a plurality of transfer apparatuses, based on the counted number; and (F) transmitting a change request requesting that the transfer processing of data transmitted by the identified first processing apparatus is to be allocated to the another transfer apparatus among the plurality of transfer apparatuses, to a management apparatus managing allocation of the transfer processing for the plurality of transfer apparatuses.

An information processing method relating to a third aspect of this technique includes: (G) upon receiving, from one transfer apparatus of a plurality of transfer apparatuses that carry out a transfer processing, a change request requesting that a first transfer processing that is allocated to the one transfer apparatus is to be allocated to another transfer apparatus among the plurality of transfer apparatuses, identifying, from among the plurality of transfer apparatuses, another transfer apparatus that will carry out the first transfer processing on behalf of a transfer apparatus that is a transmission source of the change request; and (H) upon receipt of an inquiry about a request destination of data transmitted in the first transfer processing from a processing apparatus that requests the data, transmitting identification information of the identified another transfer apparatus to the processing apparatus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram depicting an example of data stored in an agent data storage unit;

FIG. 4 is a diagram depicting an example of data stored in a data storage unit;

FIG. 5 is a diagram depicting an example of data stored in a requesting VM table;

FIG. 6 is a diagram depicting an example of data stored in an allocated VM table;

FIG. 7 is a functional block diagram of a management apparatus in the first embodiment;

FIG. 8 is a diagram depicting an example of data stored in a transfer management table;

FIG. 9 is a functional block diagram of an distribution apparatus;

FIG. 10 is a diagram depicting an example of data stored in an allocation destination table;

FIG. 11 is a functional block diagram of a service apparatus;

FIG. 12 is a functional block diagram of a collection apparatus;

DESCRIPTION OF EMBODIMENTS

Embodiment 1

Figure 1:
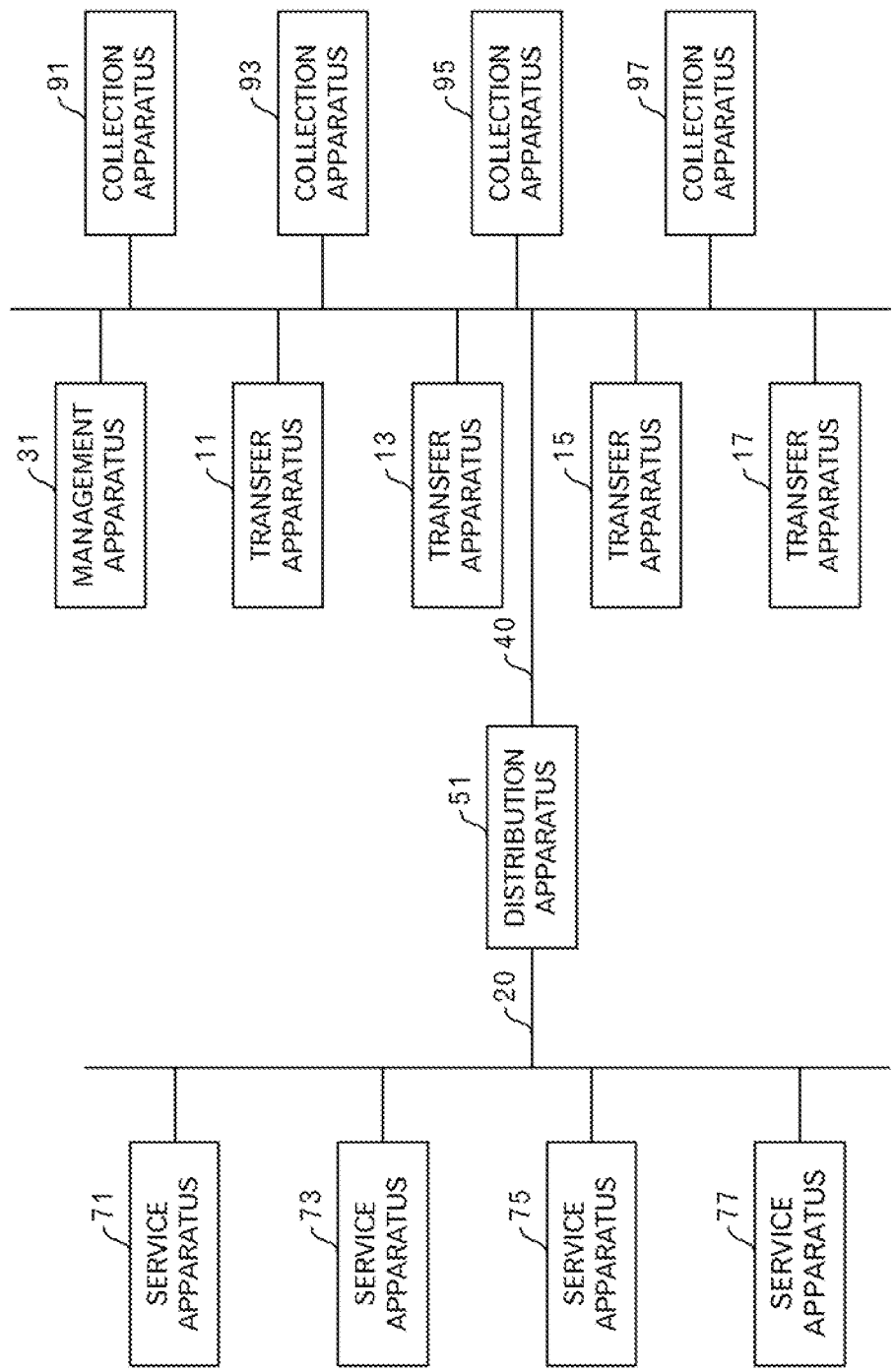
FIG. 1 is a diagram depicting a system outline relating to a first embodiment.

FIG. 1 illustrates a system in a first embodiment. For example, in a network 20 that is an LAN (Local Area Network), service apparatuses 71 to 77 (or may be called "application apparatuses") are connected with a distribution apparatus 51. The distribution apparatus 51 is connected with the LAN network 40, for example, and transfer apparatuses 11 to 17, a management apparatus 31, and collection apparatuses 91 to 97 are connected to the network 40. In FIG. 1, the number of service apparatuses, transfer apparatuses and collection apparatuses is four, however the number is not limited.

In the system illustrated in FIG. 1, one or plural VMs (Virtual Machines) are activated on the service apparatuses 71 to 77, which are physical machines. The service apparatuses 71 to 77, for example, periodically send data related to the operating status of the service apparatuses 71 to 77 (for example, the utilization rate of the processor and memory usage; hereafter called VM data) to the distribution apparatus 51. The distribution apparatus 51 sends the received VM data to the transfer apparatus for which the transfer processing for transferring the received VM data has been allocated. The transfer apparatuses 11 to 17 classify the VM data received from the distribution apparatus 51 for each collection application. The collection apparatuses 91 to 97 send an acquisition request of the VM data to the transfer apparatus that holds VM data that is to be collected, and acquires VM data from the transfer apparatus. Moreover, the collection apparatuses 91 to 97 present VM data to the administrator of the service that provides the VM. The management apparatus 31 manages allocation of the transfer processing to the transfer apparatuses 11 to 17.

In the system illustrated in FIG. 1, it is presumed that the collection apparatuses 91 to 97 know in advance which transfer apparatus stores VM data to be collected. However, when the allocation of the transfer processing changes, the collection apparatuses 91 to 97 no longer know which transfer apparatus will carry out the transfer processing of the VM data to be collected. Therefore, in this embodiment, when the collection apparatuses 91 to 97 send an acquisition request to the transfer apparatuses, and are notified by a transfer apparatus that was a destination of the acquisition request that the transfer processing to transfer VM data to be collected is not carried out, the collection apparatuses 91 to 97 send an inquiry about the request destination to the management apparatus 31. By the management apparatus 31 sending identification information of the transfer apparatus that is the new request destination to the collection apparatuses, the collection apparatuses 91 to 97 acquire VM data that is to be collected from the transfer apparatus that is the new request destination.

Figure 2:
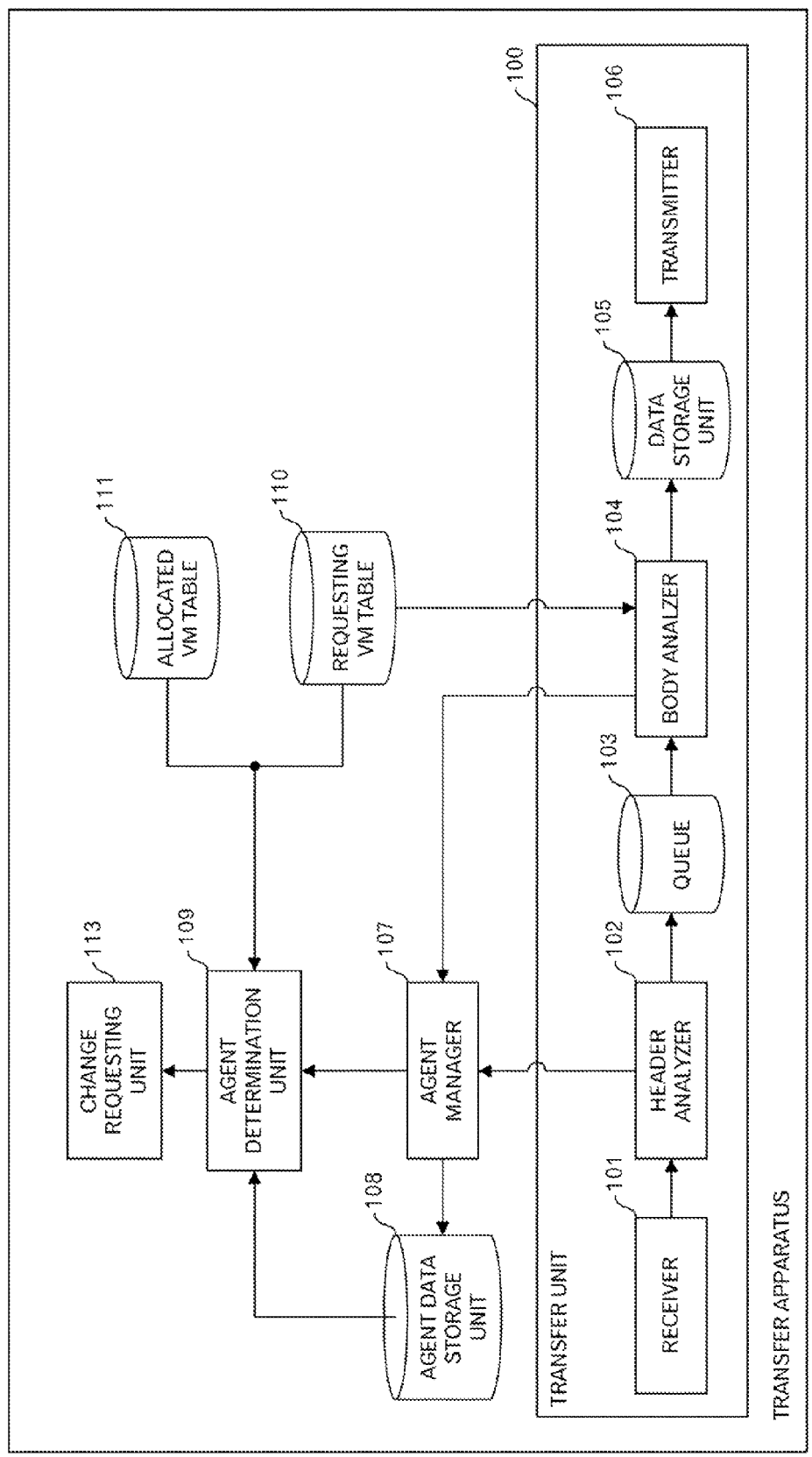
FIG. 2 is a functional block diagram of a transfer apparatus in the first embodiment.

FIG. 2 illustrates a function block diagram of the transfer apparatuses 11 to 17. The transfer apparatuses 11 to 17 include a transfer unit 100 that includes a receiver 101, a header analyzer 102, a queue 103, a body analyzer 104, a data storage unit 105 and a transmitter 106, an agent manager 107, an agent data storage unit 108, an agent determination unit 109, a requesting VM table 110, an allocated VM table 111 and a change requesting unit 113.

The receiver 101 receives VM data from the distribution apparatus 51, and outputs that VM data to the header analyzer 102. The header analyzer 102 extracts an agent ID from the VM data, and outputs a control message that includes the agent ID to the agent manager 107. Moreover, the header analyzer 102 stores the VM data in the queue 103. The body analyzer 104 classifies VM data for each collection application, and stores the VM data in the data storage unit 105. The body analyzer 104 also outputs a control message that includes the agent ID and data concerning the load caused by the classification processing to the agent manager 107. When an acquisition request is received, the transmitter 106 extracts VM data that is to be collected by the collection apparatus that is the transmission source of the acquisition request, from the data storage unit 105, and transmits the extracted VM data to the collection apparatus that is the transmission source of the acquisition request.

When a control message is received from the header analyzer 102, the agent manager 107 uses data stored in the agent data storage unit 108 to determine whether or not the allocation of the transfer processing should be changed. When it is determined that the allocation of the transfer processing should be changed, the agent manager 107 outputs a processing request to the agent determination unit 109. Moreover, when a control message is received from the body analyzer 104, the agent manager 107 updates the data stored in the agent data storage unit 108. The agent determination unit 109 uses data stored in the requesting VM table 110 and data stored in the allocated VM table 111 to identify the agent that is the transmission source of the VM data that is transferred in the transfer processing whose allocation will be changed. The change requesting unit 113 sends an allocation change request that includes the processing result by the agent determination unit 109 to the management apparatus 31.

FIG. 3 illustrates data that is stored in the agent data storage unit 108. In the example in FIG. 3, an agent ID, average load value, data representing the size of load fluctuation, and status data are stored. The average load value is calculated from the values of the loads caused by the transfer processing of the VM data received from the agent over the preset number of times. Status data "processing in progress" represents that transfer processing is being executed. Status data "change is possible" represents that it is possible to allocate the transfer processing to another transfer apparatus. Status data "change is impossible" represents that it is not possible to allocate the transfer processing to another transfer apparatus.

FIG. 4 illustrates data stored in the data storage unit 105. In the example in FIG. 4, the collection application ID and VM data that are to be collected by the collection application are stored.

FIG. 5 illustrates an example of data stored in the requesting VM table 110. In the example in FIG. 5, the collection application ID and the VM ID of the transmission source of VM data that is to be collected by the collection application are stored.

FIG. 6 illustrates an example of data that is stored in the allocated VM table 111. In the example in FIG. 6 an agent identifier, and an ID of a VM that is allocated to the agent are stored.

FIG. 7 illustrates a function block diagram of the management apparatus 31. The management apparatus 31 includes: a manager 301 that includes an identifying unit 3011 and a transmitter 3012; and a transfer management table 302. The identifying unit 3011 uses data that is stored in the transfer management table 302 to carry out a processing to identify the transfer apparatus that is the allocation destination. When an inquiry is received from a collection apparatus, the transmitter 3012 carries out a processing to transmit the IP address of the transfer apparatus that is the transfer destination to the collection apparatus.

FIG. 8 illustrates an example of data that is stored in the transfer management table 302. In the example in FIG. 8, the transfer apparatus ID, load value of the transfer apparatus, and IP address of the transfer apparatus are stored. The management apparatus 31 periodically receives load data from the transfer apparatuses 11 to 17 and updates the data that is stored in the transfer management table 302.

FIG. 9 illustrates a function block diagram of the distribution apparatus 51. The distribution apparatus 51 includes a distribution unit 501 and a distribution destination table 502. The distribution unit 501 uses the data stored in the distribution destination table 502 to transmit VM data that was received from the service apparatuses 71 to 77 to the transfer apparatuses for which the transfer processing of that VM data is allocated. In carrying out the distribution, a session ID that is included in the VM data is used.

FIG. 10 illustrates an example of data that is stored in the distribution destination table 502. In the example in FIG. 10, a session ID and IP address of the transfer apparatus are stored.

FIG. 11 illustrates a function block diagram of the service apparatuses 71 to 77. The service apparatuses 71 to 77 include an agent 701, and VMs 702 to 704 that are built using the hardware resources of the service apparatus. The agent 701 periodically acquires VM data for the VMs 702 to 704, and transmits that VM data to the distribution apparatus 51. The agent 701 is realized by executing a program such as an application program in the service apparatus.

FIG. 12 illustrates a function block diagram of the collection apparatuses 91 to 97. The collection apparatuses 91 to 97 include a collection application 901 and a VM data storage unit 902. The collection application 901 transmits an acquisition request to the transfer apparatuses that are supposed to execute the transfer processing of VM data that is to be collected, acquires the VM data and stores that VM data in the VM data storage unit 902.

Figure 13:
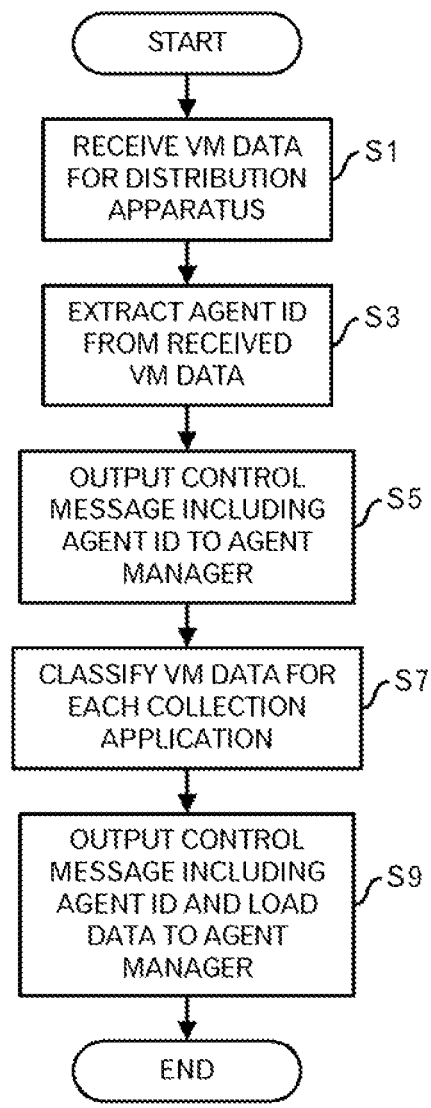
FIG. 13 is a diagram depicting a processing flow of a processing carried out when the transfer apparatus receives VM data from the distribution apparatus.
Figures 14, 19:
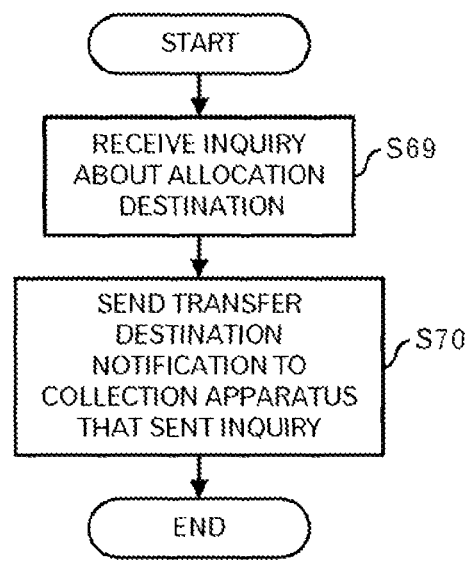
FIG. 14 is a diagram depicting an example of VM data.
FIG. 19 is a diagram depicting a processing flow of a processing carried out by the management apparatus that received an inquiry from the collection apparatus.

Next, FIG. 13 and FIG. 14 will be used to explain the processing that is carried out in the system illustrated in FIG. 1. First, using FIG. 13 and FIG. 14, the processing that is carried out when the transfer apparatuses 11 to 17 received VM data from the distribution apparatus 51 will be explained.

When the receiver 101 in the transfer apparatus receives VM data from the distribution apparatus 51 (FIG. 13: step S1), the receiver 101 outputs that VM data to the header analyzer 102.

FIG. 14 illustrates an example of VM data. FIG. 14 illustrates VM data that was sent by the agent 1 through Hyper Text Transfer Protocol (HTTP). The VM data includes VM1 data, VM2 data and VM3 data. The VM data also includes a session ID.

The header analyzer 102 then extracts the agent ID from the received VM data (step S3). For example, the header analyzer 102 extracts the agent ID from the header portion of a packet that includes VM data. The header analyzer 102 also outputs a control message that includes the extracted agent ID to the agent manager 107 (step S5), and stores the VM data in the queue 103.

The body analyzer 104 classifies the VM data that is stored in the queue 103 for each collection application, and stores the classification result in the data storage unit 105 (step S7). For example, as illustrated in FIG. 5, when the collection application 3 collects the VM2 data, the VM2 data is stored in the data storage unit 105 in association with the collection application ID "3".

The body analyzer 104 generates a control message that includes the ID of the agent, which is included in the VM data, and data concerning the load (processor utilization rate and the like) that occurred due to the classification processing. Then, the body analyzer 104 outputs the generated control message to the agent manager 107 (step S9). The size of the load that occurred due to the classification processing depends, for example, on the size of the VM data, the number of VMs, the number of collection applications. The processing then ends.

As described above, by classifying the VM data in advance, it becomes possible to transmit the VM data in response to the acquisition request from the collection apparatus.

Figure 15:
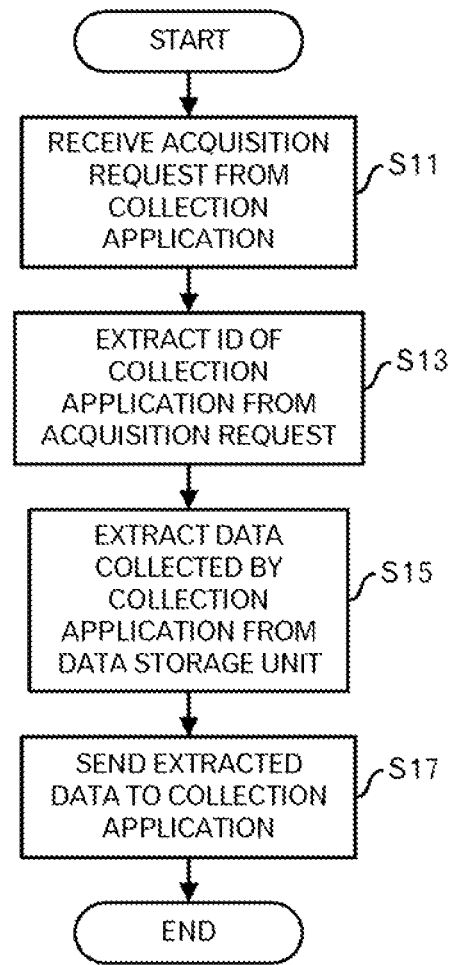
FIG. 15 is a diagram depicting a processing flow of a processing carried out when the transfer apparatus received an acquisition request from a collection application in the first embodiment.

Next, using FIG. 15, the processing carried out when the transfer apparatuses 11 to 17 received an acquisition request from one of the collection apparatuses 91 to 97 will be explained.

First, when an acquisition request for requesting the acquisition of the VM data is received from one of the collection apparatuses 91 to 97 (FIG. 15: step S11), the transmitter 106 extracts the collection application ID from the acquisition request (step S13).

The transmitter 106 extracts VM data that corresponds to the collection application ID extracted at the step S13 from the data storage unit 105 (step S15).

The transmitter 106 transmits the VM data extracted at the step S15 to the collection apparatus that is the transmission source of the acquisition request (step S17). The processing then ends.

By carrying out the processing such as described above, the collection application is able to acquire the VM data that is to be collected.

Figure 16:
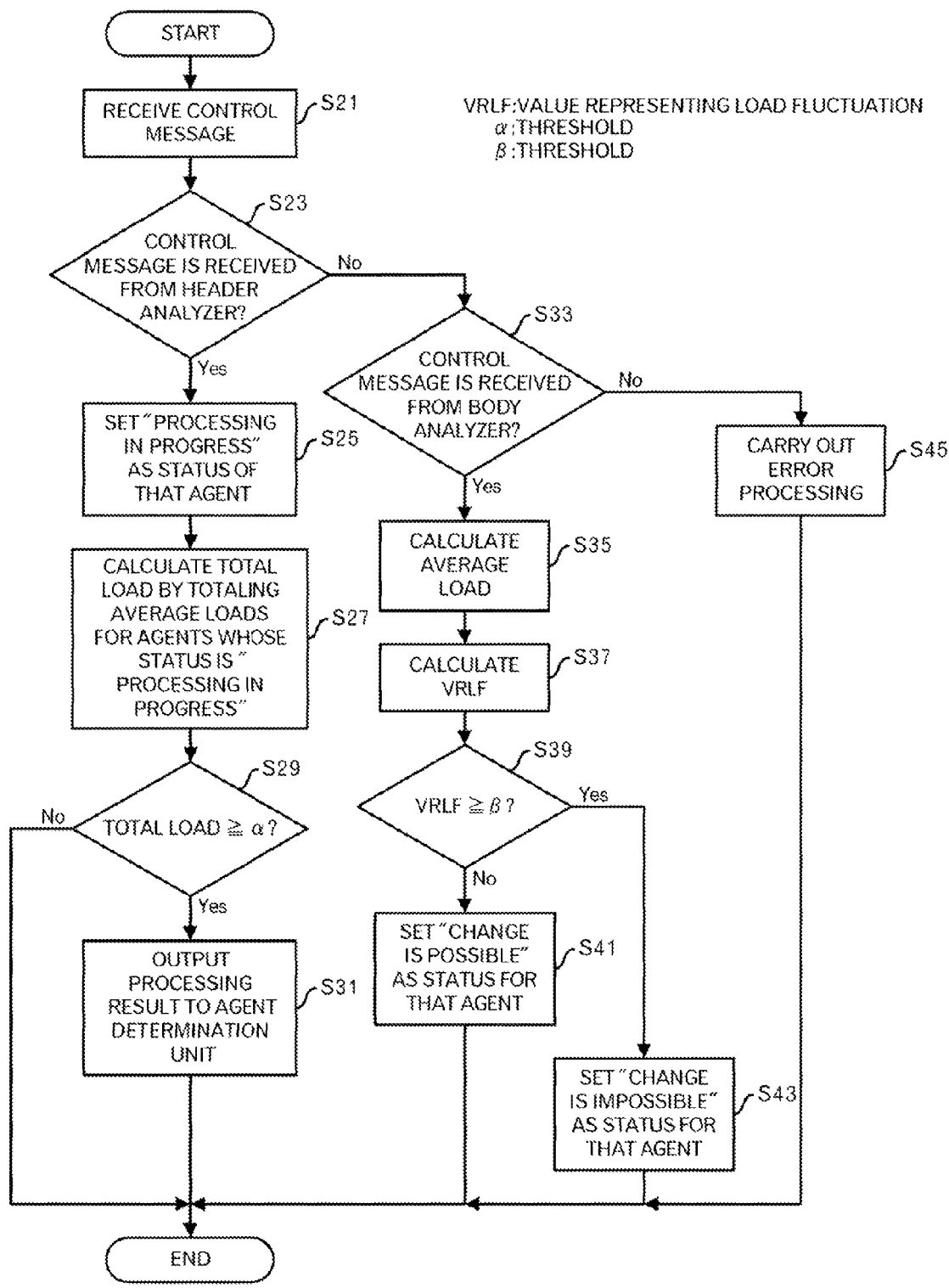
FIG. 16 is a diagram depicting a processing flow of a processing carried out by an agent manager.

Next, FIG. 16 will be used to explain the processing that is carried out by the agent manager 107 of the transfer apparatuses 11 to 17. First, the agent manager 107 receives a control message from the header analyzer 102 or body analyzer 104, and stores that control message in a storage device such as a memory (FIG. 16: step S21).

The agent manager 107 determines whether or not a control message has been received from the header analyzer 102 (step S23). For example, when load data is not included in the control message, but an agent ID is included, the agent manager 107 determines that the control message was received from the header analyzer 102.

When a control message is received from the header analyzer 102 (step S23: YES route), the agent manager 107 extracts the agent ID from the control message. Then, the agent manager 107 sets status data "processing in progress" that corresponds to the extracted agent ID in the agent data storage unit 108 (step S25).

The agent manager 107 totals the values of the average loads of the agents whose status is "processing in progress" to calculate the value of the total load (step S27). Then, the manager 107 determines whether or not the value of the total load is equal to or greater than a predetermined threshold value $\alpha$ (step S29).

When the value of the total load is less than the predetermined threshold value $\alpha$ (step S29: NO route), the processing ends. However, when the value of the total load is equal to or greater than the predetermined threshold value $\alpha$ (step S29: YES route), the agent manger 107 outputs a processing request to the agent determination unit 109 (step S31). The processing then ends.

On the other hand, when it is determined at the step S23 that the control message was not received from the header analyzer 102 (step S23: NO route), the agent manager 107 determines whether or not the control message was received from the body analyzer 104 (step S33). For example, when an agent ID and load data are included in the control message, it is determined that the control message was received from the body analyzer 104.

When the control message was not received from the body analyzer 104 (step S33: NO route), the agent manager 107 carries out an error processing (step S45). At the step S45, for example, the agent manager 107 sends a message representing that an error occurred to the management apparatus 31. The processing then ends.

On the other hand, when the control message was received from the body analyzer 104 (step S33: YES route), the agent manager 107 uses the load data that is included in the control message to calculate the value of the average load, and updates the value of the average load, which corresponds to the agent ID that is included in the control message (step S35). At the step S35, the value of the average load is calculated using past load data that is stored in the storage device such as the memory and the load data that was received this time.

The agent manager 107 uses the load data that is included in the control message to calculate a value (for example, dispersion) that expresses the fluctuation in the load (step S37). At the step S37, the agent manager 107 uses past load data that is stored in the storage device such as the memory and the load data that was received this time to calculate a value that expresses the fluctuation in the load.

The agent manager 107 determines whether or not the value that represents the load fluctuation is equal to or greater than a predetermined threshold value $\beta$ (step S39). When the value that represents the load fluctuation is equal to or greater than the predetermined threshold value $\beta$ (step S39: YES route), the agent manager 107 registers "large" in the column of the load fluctuation, which corresponds to the agent ID included in the control message, in the agent data storage unit 108. Moreover, the agent manager 107 sets "change is impossible" as the status data that corresponds to the agent ID included in the control message in the agent data storage unit 108 (step S43). The processing then ends. On the other hand, when the value that represents the load fluctuation is less than the predetermined threshold value β (step S39: NO route), the agent manager 107 registers "small" in the column of the load fluctuation, which corresponds to the agent ID included in the control message in the agent data storage unit 108. Moreover, the agent manager 107 sets "change is possible" as the status data that corresponds to the agent ID included in the control message in the agent data storage unit 108 (step S41). The processing then ends.

By carrying out the processing described above, it becomes possible to determine whether or not allocation should be changed. Moreover, in the case of the transfer processing having the large load fluctuation, by preventing from allocating the transfer processing to other transfer apparatuses, it is possible to prevent the load of other transfer apparatuses from becoming unstable.

Figure 17:
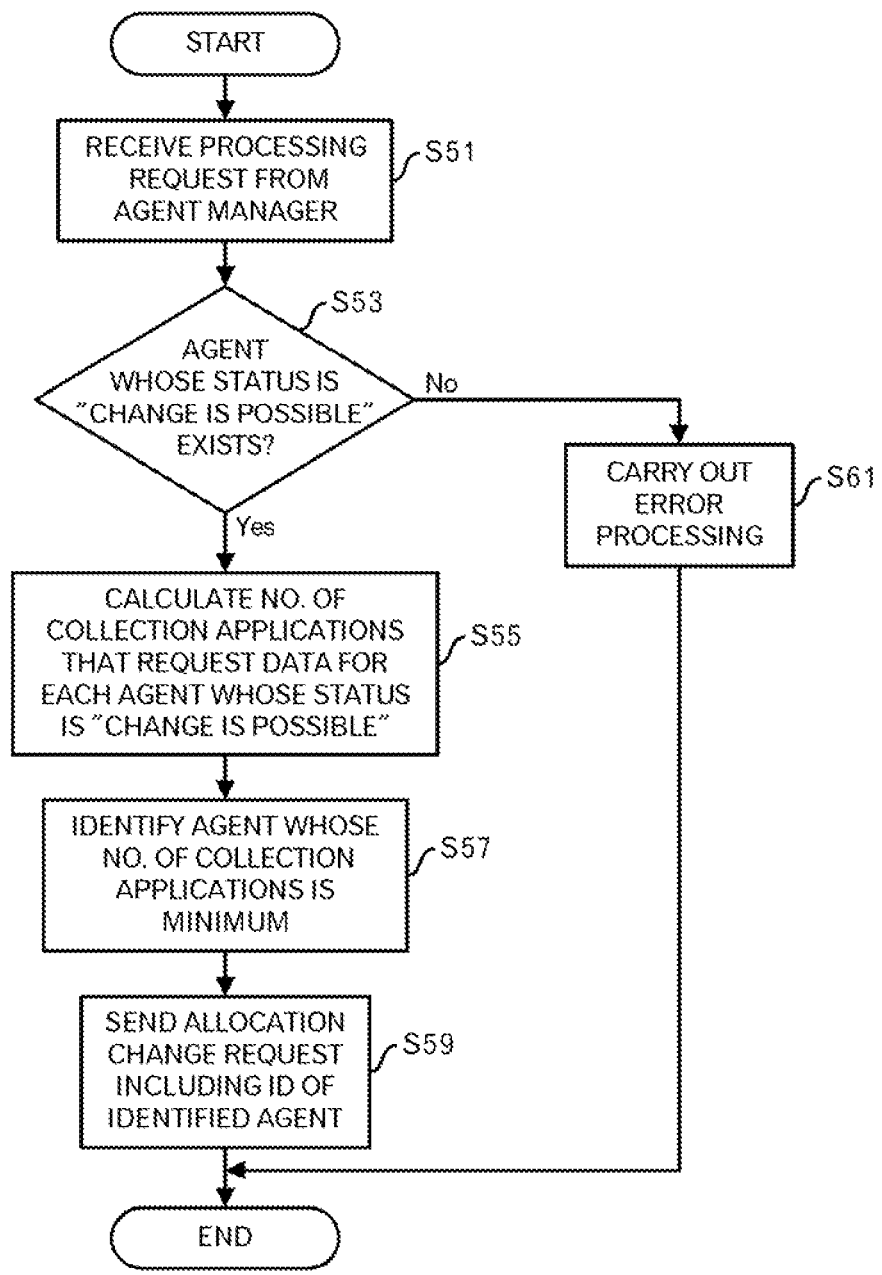
FIG. 17 is a diagram depicting a processing flow of an agent determination processing in the first embodiment.

Next, FIG. 17 will be used to explain the agent determination processing. First, the agent determination unit 109 receives a processing request from the agent manager 107 (FIG. 17: step S51). Then, the agent determination unit 109 determines whether or not there are any agents whose status in the agent data storage unit 108 is "change is possible" (step S53).

When there are no agents whose status is "change is possible" (step S53: NO route), the agent determination unit 109 carries out an error processing (step S61). For example, the agent determination unit 109 sends an error message representing that there is no transfer processing that can be allocated to other transfer apparatuses, to the management apparatus 31. The processing then ends.

On the other hand, when there is an agent whose status is "change is possible" (step S53: YES route), the agent determination unit 109 calculates the number of collection applications requesting the VM data for each of the agents whose status is "change is possible" (step S55).

The calculation method at the step S55 will be explained in detail using FIG. 5 and FIG. 6. For example, for agent 1, VMs 1 to 10 are registered in the allocated VM table 111, so the requesting VM table 110 is searched for collection applications that collect VM data of any one of the VMs 1 to 10. Here, collection application 1, collection application 2 and collection application 3 are identified, so the number of collection applications is "3".

For agent 2, VMs 11 to 30 are registered in the allocated VM table 111, so the requesting VM table 110 is searched for collection applications that collect VM data of any one of the VMs 11 to 30. Here, collection application 1 and collection application 2 are identified, so the number of collection applications is "2".

The same calculation is also carried out for agent 3 and agent 4, and the number of collection applications that collect VM data that agent 3 sends is "2", and the number of collection applications that collect VM data that agent 4 sends is "1".

Returning to the explanation of FIG. 17, the agent determination unit 109 identifies an ID of the agent having the least value calculated at the step S55 (step S57). In the case of the example in FIG. 5 and FIG. 6, this is agent 4.

The change requesting unit 113 sends an allocation change request that includes the agent ID that was identified at the step S57 to the management apparatus 31 (step S59). The processing then ends.

By carrying out the processing described above, it is possible to reduce the number of collection apparatuses that are affected by a change in the allocation, so it is possible to reduce inquiries to the management apparatus from the collection apparatuses, and to reduce the load that occurs in the management apparatus due to handling inquiries. Furthermore, it is becomes possible to reduce the amount of communication between the management apparatus 31 and the collection apparatuses 91 to 97.

Figure 18:
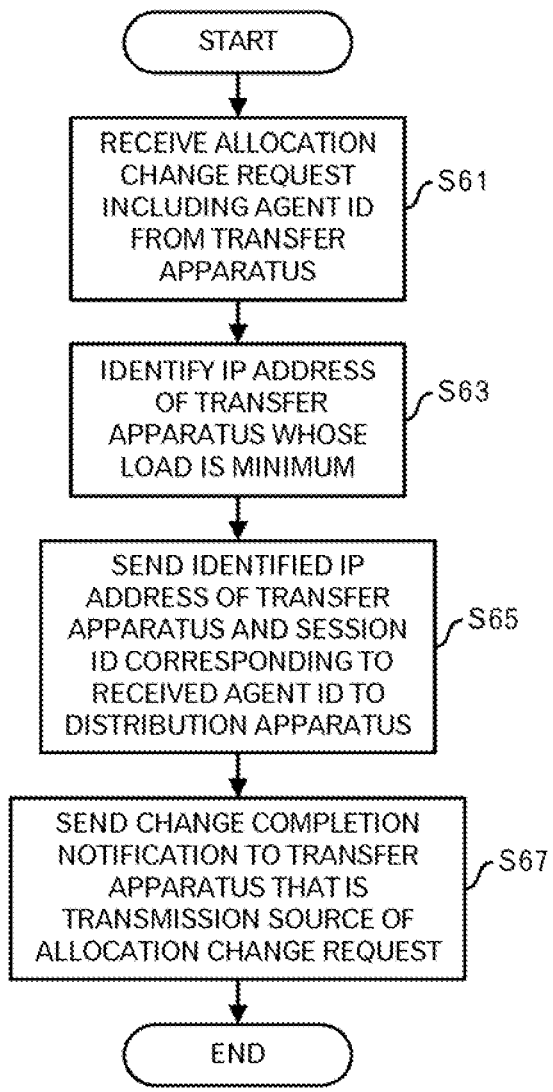
FIG. 18 is a diagram depicting a processing flow of a processing carried out by the management apparatus that received an allocation change request in the first embodiment.

Next, FIG. 18 will be used to explain a processing that is carried out by the management apparatus 31 when an allocation change request is received. First, the identifying unit 3011 receives an allocation change request that includes an agent ID from a transfer apparatus, and stores that request in the storage device such as the memory (step S61).

The identifying unit 3011 identifies, from the transfer management table 302, the IP address of the transfer apparatus (except for the transfer apparatus that is the transmission source of the allocation change request) that has the least load (step S63).

The transmitter 3012 sends the IP address of the identified transfer apparatus and the session ID that corresponds to the received agent ID to the distribution apparatus 51 (step S65). The management apparatus 31 has a table (not illustrated in the figures) that stores the agent IDs in association with session IDs, and identifies the session ID using this table. The reason for sending the session ID to the distribution apparatus 51 is because the distribution apparatus 51 carries out the distribution using the session ID.

The transmitter 3012 transmits a change complete notification to the transfer apparatus that was the transmission source of the allocation change request (step S67). The processing then ends.

By carrying out the processing such as described above, it becomes possible to disperse the load to other transfer apparatuses when the load on a certain transfer apparatus becomes high. Moreover, even after the allocation of the transfer processing has been changed, it is possible to adequately transfer the VM data.

Next, using FIG. 19, the processing carried out by the management apparatus 31 that received an inquiry from one of the collection apparatuses 91 to 97 will be explained.

First, the transmitter 3012 receives an inquiry about the transfer apparatus that is the allocation destination from one of the collection apparatuses 91 to 97 (FIG. 19: step S69). Then, the transmitter 3012 transmits a transfer destination notification that includes the agent ID that was received at the step S61 and the IP address of the transfer apparatus that was identified at the step S63 to the collection apparatus that was the transmission source of the inquiry (step S70). The processing then ends.

By carrying out the processing such as described above, it is possible for the collection apparatus to continue collecting VM data even after the allocation has been changed.

Embodiment 2

Next, a second embodiment will be explained. In this second embodiment, the agent determination processing is different from that in the first embodiment. The other portions are the same as those in the first embodiment, so explanations of those portions will be omitted.

Figure 20:
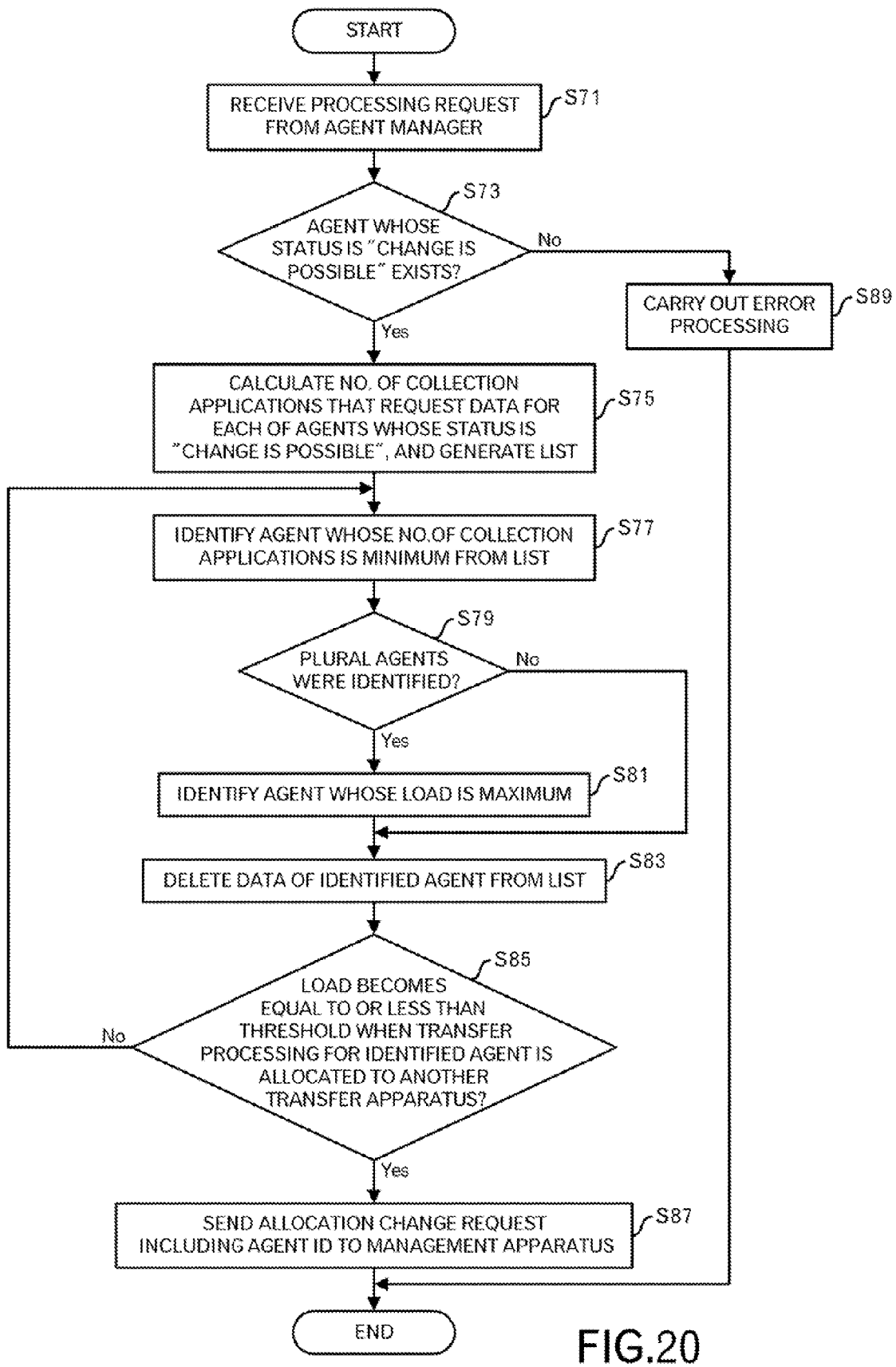
FIG. 20 is a diagram depicting a processing flow of the agent determination processing in a second embodiment.

The agent determination processing in this second embodiment will be explained using FIG. 20. First, the agent determination unit 109 receives a processing request from the agent manager 107 (FIG. 20: step S71). Then, the agent determination unit 109 determines whether or not there is an agent whose status in the agent data storage unit 108 is "change is possible" (step S73).

When there are not agents whose status is "change is possible" (step S73: NO route), the agent determination unit 109 carries out an error processing (step S89). For example, the agent determination unit 109 sends an error message representing that there is no transfer processing that can be allocated to other transfer apparatuses to the management apparatus 31. The processing then ends.

Figure 21A:
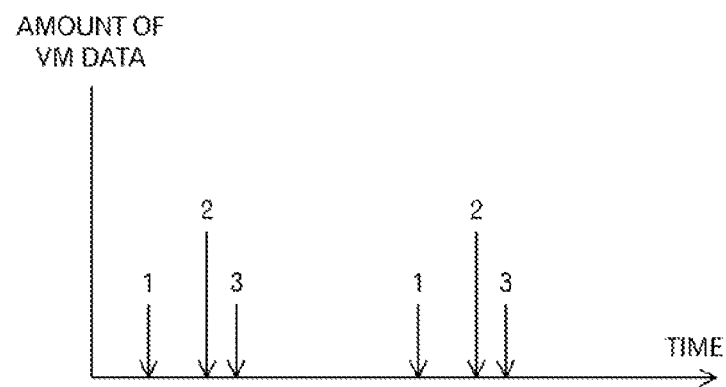
FIG. 21A is a diagram depicting a list generated by the agent determination unit in the second embodiment.

On the other hand, when there is an agent whose status is "change is possible" (step S73: YES route), the agent determination unit 109 calculates the number of collection applications that collect VM data for each agent whose status is "change is possible", and generates a list using the calculation results (step S75). The calculation method at the step S75 is the same as the method explained for the first embodiment. At the step S75, a list such as illustrated in FIG. 21A is generated. In the list in FIG. 21A, agent ID, and the number of collection application are stored.

The agent determination unit 109 identifies the agent having the least number of collection applications from the list generated at the step S75 (step S77).

The agent determination unit 109 determines whether or not the number of identified agents is plural (step S79). When the number of identified agents is not plural (step S79: NO route), the processing moves to step S83. On the other hand, when the number of identified agents is plural (step S79: YES route), the agent determination unit 109 uses average load data that is stored in the agent data storage unit 108, and identifies one agent of the plural agents, which has the greatest average load (step S81).

The agent determination unit 109 deletes the data of the agent identified at the step S81 from the list (step S83). Then, the agent determination unit 109 determines whether or not the total value of the loads of the allocated transfer processing is equal to or less than a predetermined threshold value γ, if the transfer processing for the agent deleted from the list at the step S83 would be allocated to another transfer apparatus (step S85). At the step S85, the value of the average load of the agents whose status is "change in progress" and the value of average load of the agents whose status is "processing in progress" are totaled.

When the total of the load values of the allocated transfer processing is not equal to or less than the predetermined threshold value γ (step S85: NO route), the processing returns to the processing of the step S77 to further identify agents. On the other hand, when the total of the load values of the allocated transfer processing is equal to or less than the predetermined threshold value γ (step S85: YES route), the change requesting unit 113 sends an allocation change request that includes IDs of the identified agents to the management apparatus 31 (step S87). The processing then ends.

By carrying out the processing such as described above, it is possible to reduce the number of inquiries from the collection apparatuses 91 to 97 to the management apparatus 31. Furthermore, it is possible to prevent the loads on the transfer apparatuses from becoming high.

Figure 21B:
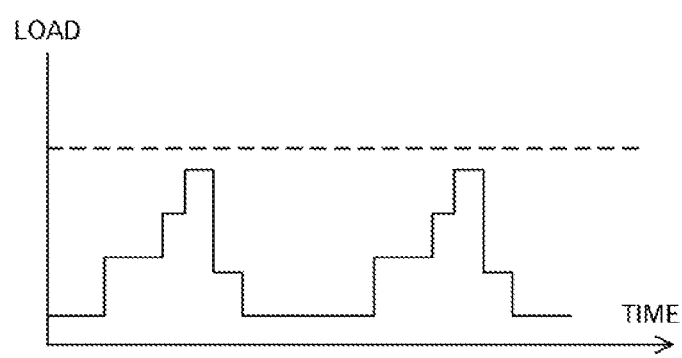
FIG. 21B is a diagram to explain a relationship between the amount of VM data and a load of the transfer apparatus.
Figure 21C:
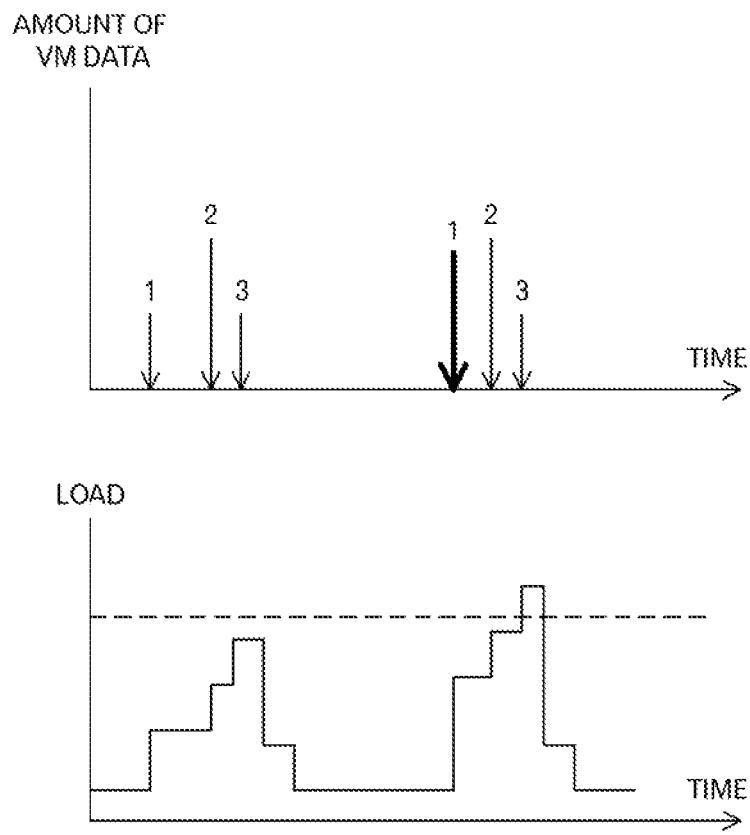
FIG. 21C is a diagram to explain a relationship between the amount of VM data and a load of the transfer apparatus.
Figure 21D:
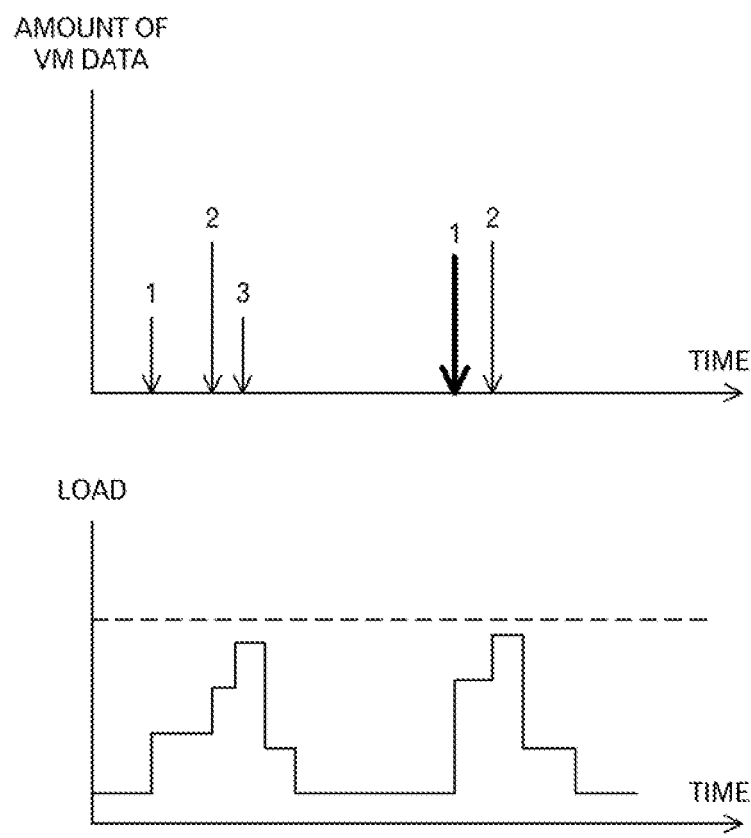
FIG. 21D is a diagram to explain a relationship between the amount of VM data and a load of the transfer apparatus.

The reason why it is possible to prevent the load on the transfer apparatus from becoming high in advance will be explained using FIG. 21B to FIG. 21D. FIG. 21B to FIG. 21D illustrate the relationship between the amount of VM data and the load on the transfer apparatus. In these figures, the horizontal axis in the top graph represents the time and the vertical axis in the top graph represents the amount of VM data. In other words, the length of each arrow expresses the amount of VM data. The horizontal axis in the bottom graph expresses the time, and the vertical axis in the bottom graph expresses the load on the transfer apparatus.

As illustrated in the top graph in FIG. 21B, when the transfer apparatus periodically receives VM data 1 to 3, there is no large change in the amount of VM data, so the load on the transfer apparatus constantly changes, repeatedly.

However, as illustrated in the top graph in FIG. 21C, when timing when VM data 1 is received is delayed for some reason (for example, a problem occurred in a service apparatus), VM data that includes the delayed portion of VM data is sent to the transfer apparatus all at one time. As a result, the load on the transfer apparatus due to the processing for the VM data 1 becomes high, and furthermore, when VM data 2 and VM data 3 are received to begin the processing for the VM data 2 and 3, as illustrated in the bottom graph in FIG. 21C, the size of the load exceeds a predetermined reference.

Therefore, as described above, part of the processing (the processing for VM data 3 in the example in FIG. 21D) is allocated to another transfer apparatus. By doing so, even when the processing load of the transfer apparatus is greater than the originally required processing because of the processing for VM data 1, the load does not exceed the predetermined reference. In other words, it is possible to prevent the load on the transfer apparatus from unexpectedly becoming high beforehand.

Embodiment 3

Next, a third embodiment will be explained. In this third embodiment, the agent determination processing is different from those in the first and second embodiments. The other portions are the same as in the first and second embodiments so explanations of those portions are omitted.

Figure 22:
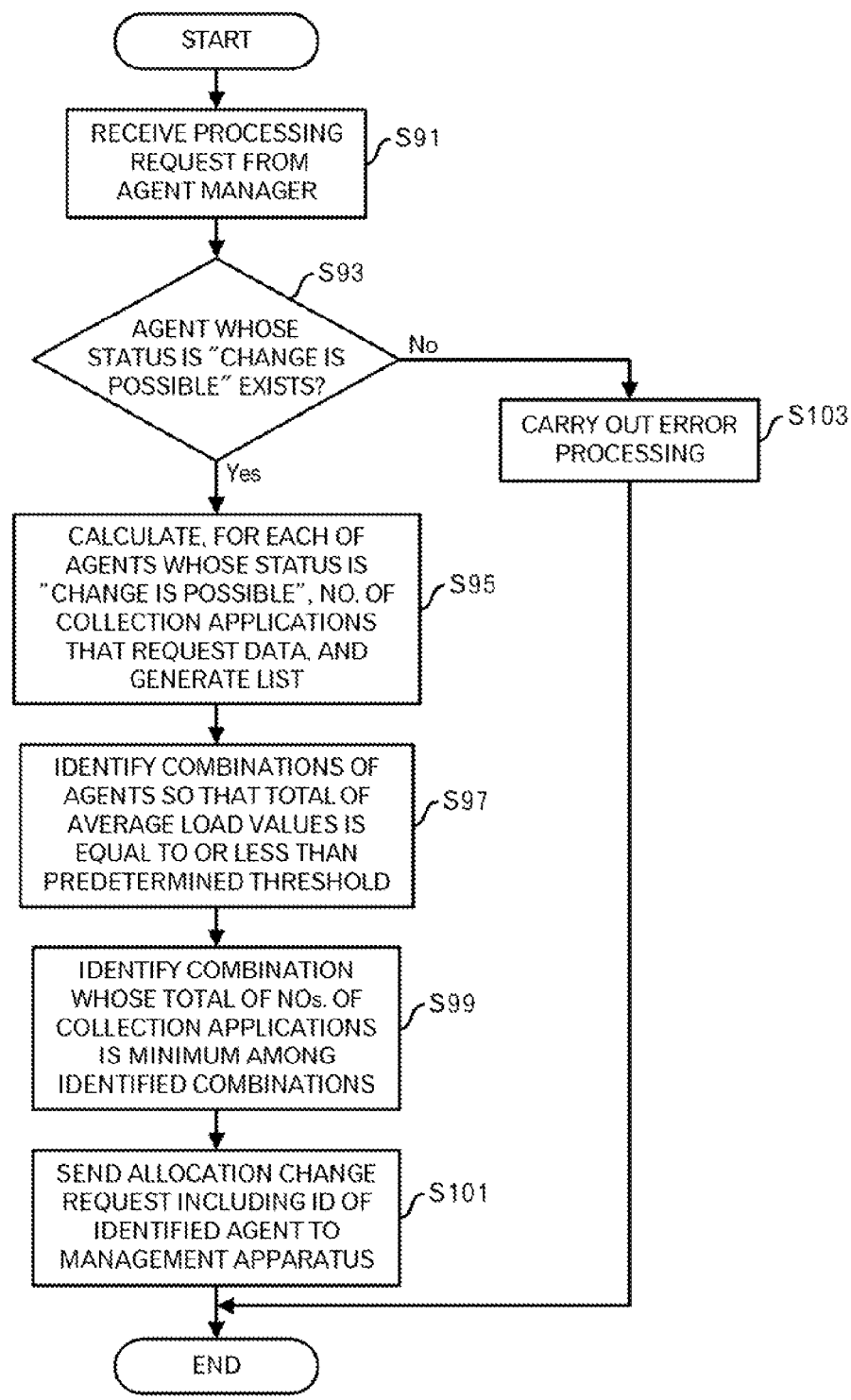
FIG. 22 is a diagram depicting a processing flow of the agent determination processing in a third embodiment.

The agent determination processing in this third embodiment will be explained using FIG. 22. First, the agent determination unit 109 receives a processing request from the agent manager 107 (FIG. 22: step S91). Then, the agent determination unit 109 determines whether or not there are any agents whose status in the agent data storage unit 108 is "change is possible" (step S93).

When there are no agents whose status is "change is possible" (step S93: NO route), the agent determination unit 109 carries out an error processing (step S103). For example, the agent determination unit 109 sends an error message representing that there is no transfer processing that can be allocated to another transfer apparatus to the management apparatus 31. The processing then ends.

On the other hand, when there are agents whose status is "change is possible" (step S93: YES route), the agent determination unit 109 calculates the number of collection applications that collect VM data for each agent whose status is "change is possible", and generates a list by using the calculation results (step S95). The calculation method used at the step S95 is the same as the method explained in the first embodiment. At the step S95, a list such as illustrated in FIG. 21A is generated.

The agent determination unit 109 identifies combinations of agents from among the agents whose status is "change is possible" so that the total value of the average loads for agents whose status is "processing in progress" or "change is possible" is equal to or less than a predetermined threshold value δ (step S97).

For example, when data such as that illustrated in FIG. 3 is stored in the agent data storage unit 108, the total value of the average loads of the agents whose status is "processing in progress" or "change is possible" is 100. Here, the predetermined threshold value δ is presumed to be 90. When allocating the transfer processing for agent 3 to another transfer apparatus, the total value of the average loads becomes 80, so the total value of the average loads becomes equal to or less than the predetermined threshold value δ. When allocating the transfer processing for agent 4 to another transfer apparatus, the total value of the average loads becomes 80, so the total value of the average loads becomes equal to or less than the predetermined threshold value δ. When allocating the transfer processing for agent 3 and agent 4 to other transfer apparatuses, the total value of the average loads becomes 60, so the total value of the average loads becomes equal to or less than the predetermined threshold value δ. Therefore, the three combinations "agent 3", "agent 4" and "agent 3 and agent 4" are identified.

Figures 23, 25, 26:
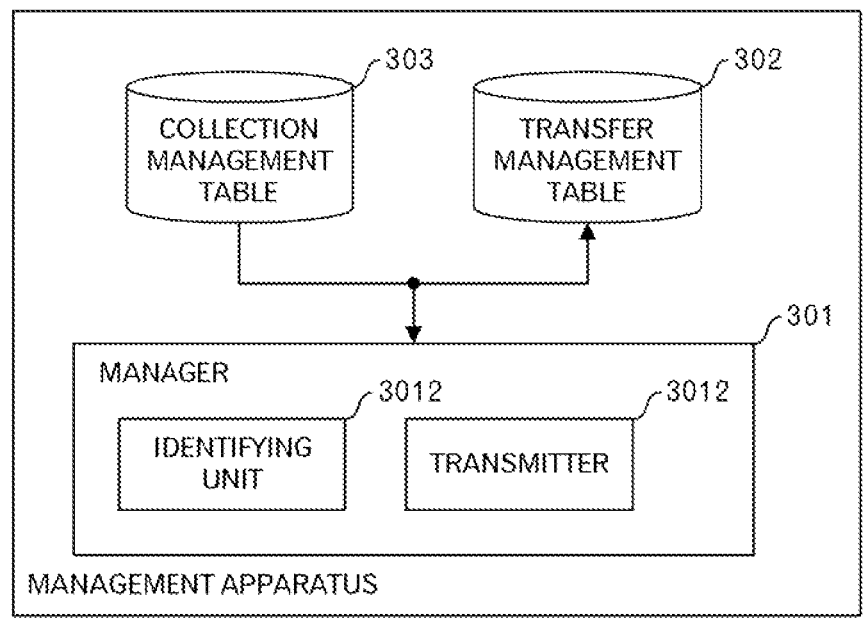
FIG. 23 is a diagram to explain a processing to determine an agent.
FIG. 25 is a diagram depicting an example of data stored in an allocation destination table.
FIG. 26 is a functional block diagram of a management apparatus in the fourth embodiment.

The agent determination unit 109 identifies a combination whose total number of collection applications is the least from among the combinations identified in step S97 (step S99). In the example illustrated in FIG. 3, when calculating the total number of collection applications for each of the combinations based on the list generated at the step S95, the result is as illustrated in FIG. 23. Therefore, at the step S99, the agent 4 is identified.

The change requesting unit 113 sends an allocation change request that includes the identified agent ID to the management apparatus 31 (step S101). The processing then ends.

By carrying out the processing such as described above, it is possible to suitably disperse the load among plural transfer apparatuses. Moreover, the number of collection apparatuses that are affected by a change in allocation is reduced, so it is possible to suppress the load that occurs due to management apparatus handling inquiries.

Embodiment 4

Next, a fourth embodiment will be explained. In this fourth embodiment, the transfer apparatuses 11 to 17 and the management apparatus 31 are different from those in the first through third embodiments. The other portions are the same as in the first embodiment, so explanations of those portions will be omitted.

Figure 24:
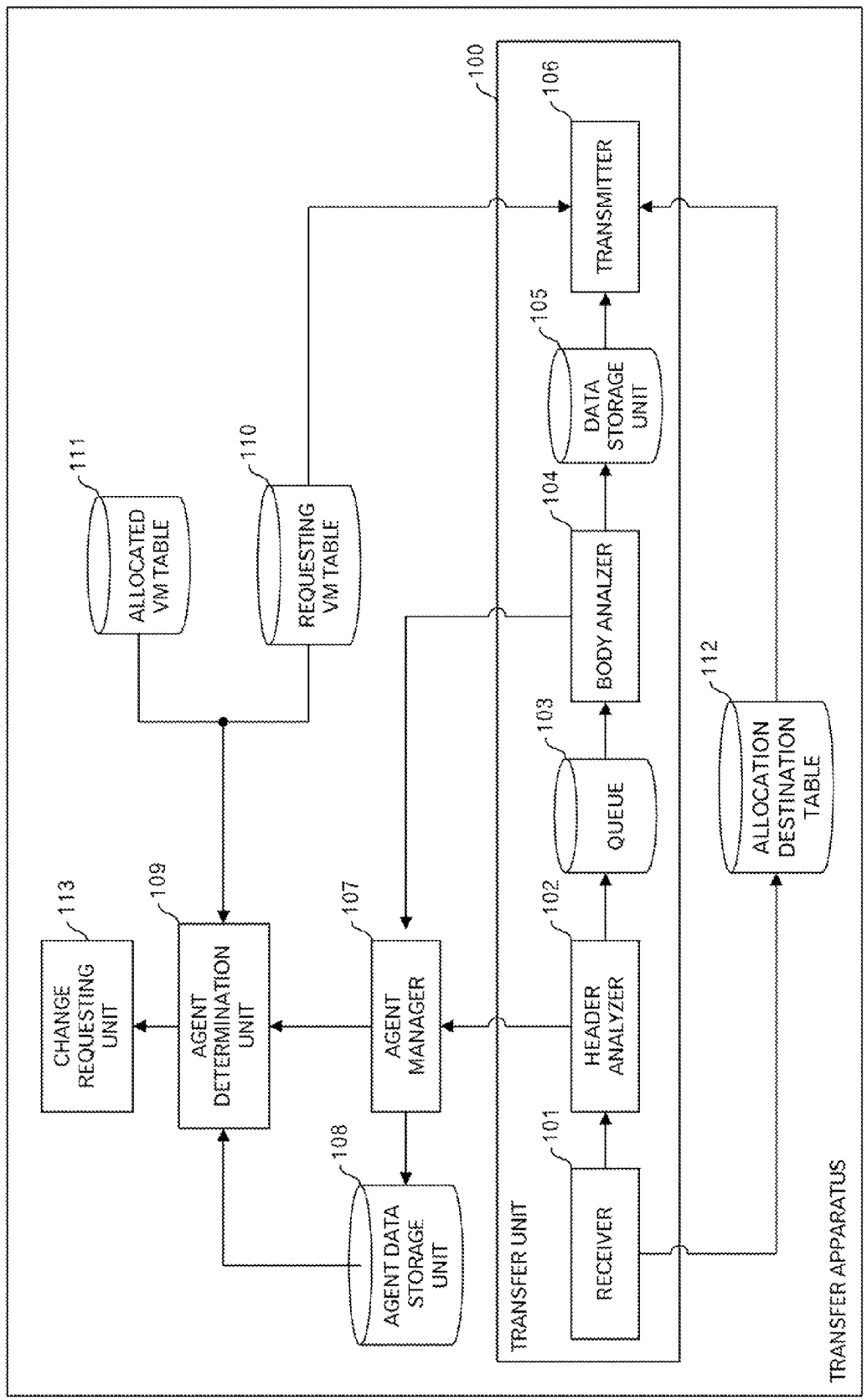
FIG. 24 is a functional block diagram of a transfer apparatus in a fourth embodiment.

FIG. 24 illustrates a block diagram of functions of the transfer apparatuses 11 to 17 in the fourth embodiment. The transfer apparatuses 11 to 17 of this fourth embodiment include a transfer unit 100 that includes a receiver 101, a header analyzer 102, a queue 103, a body analyzer 104, a data storage unit 105 and a transmitter 106, an agent manager 107, and agent data storage unit 108, an agent determination unit 109, a requesting VM table 110, an allocated VM table 111, an allocation destination table 112 and a change requesting unit 113.

The receiver 101 receives VM data from the distribution apparatus 51, and outputs that VM data to the header analyzer 102. Moreover, when the receiver 101 receives the IP address and agent ID of the transfer apparatus that is the allocation destination of the transfer processing from the management apparatus 31, the receiver 101 stores them in the allocation destination table 112. The header analyzer 102 extracts an agent ID from the VM data, and outputs a control message that includes the agent ID to the agent manager 107. Moreover, the header analyzer 102 stores the VM data in the queue 103. The body analyzer 104 classifies VM data for each collection application, and stores the VM data in the data storage unit 105. The body analyzer 104 also outputs a control message that includes the agent ID and data of the load caused by classification processing to the agent manager 107. When an acquisition request is received, the transmitter 106 extracts VM data that is to be collected by the collection apparatus that is the transmission source of the acquisition request from the data storage unit 105, and transmits that VM data to the collection apparatus that is the transmission source of the acquisition request. The transmitter 106 also transmits the IP address of the transfer apparatus that is the allocation destination of the transfer processing to the collection apparatus that is the transmission source of the acquisition request.

When a control message is received from the header analyzer 102, the agent manager 107 uses data stored in the agent data storage unit 108 and determines whether or not the allocation of the transfer processing is changed. When it is determined that the allocation of the transfer processing is changed, the agent manager 107 outputs a processing request to the agent determination unit 109. Moreover, when a control message is received from the body analyzer 104, the agent manager 107 updates the data stored in the agent data storage unit 108. The agent determination unit 109 uses data stored in the requesting VM table 110 and data stored in the allocated VM table 111 to identify a service apparatus that is the transmission source of the VM data that is transferred in the transfer processing for which the allocation is changed. The change requesting unit 113 sends an allocation change request that includes the processing result by the agent determination unit 109 to the management apparatus 31.

FIG. 25 illustrates an example of data that is stored in the allocation destination table 112. In the example in FIG. 25, the agent ID and the IP address of the transfer apparatus that is the allocation destination are stored.

FIG. 26 illustrates a functional block diagram of the management apparatus 31 in this fourth embodiment. The management apparatus 31 includes a manager 301 that includes an identifying unit 3011 and a transmitter 3012, a transfer management table 302, and a collection management table 303. The identifying unit 3011 uses data that is stored in the transfer management table 302 to carry out a processing to identify a transfer apparatus that is the allocation destination of the transfer processing. When an inquiry from a collection apparatus is received, the transmitter 3012 sends the IP address of the transfer apparatus that is the transfer destination to the collection apparatus. The transmitter 3012 also uses the data stored in the collection management table 303 to carry out a processing for transmitting the IP address of the transfer apparatus that is the allocation destination of the transfer processing to the collection apparatuses 91 to 97.

Figures 27, 28:
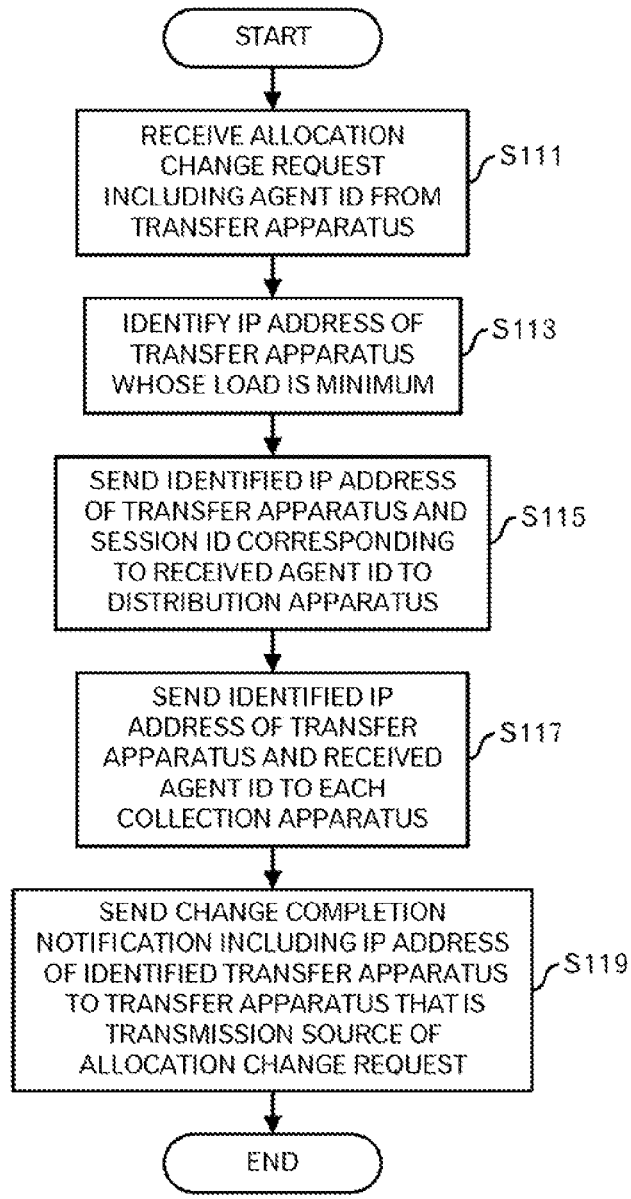
FIG. 27 is a diagram depicting an example of data stored in a collection management table.
FIG. 28 is a diagram depicting a processing flow of a processing carried out by the management apparatus that received an allocation change request in the fourth embodiment.

FIG. 27 illustrates an example of data that is stored in the collection management table 303. In the example in FIG. 27, a collection application ID, and IP address of collection apparatus are stored.

Next, the processing that is performed by the management apparatus 31 that received an allocation change request will be explained using FIG. 28. First, the identifying unit 3011 receives an allocation change request that includes the agent ID from the transfer apparatus, and stores that request in a storage device such as a memory or the like (FIG. 28: step S111).

The identifying unit 3011 identifies, from the transfer management table 302, the IP address of the transfer apparatus (except for the transfer apparatus that is the transmission source of the allocation change request) that has the least load (step S113).

The transmitter 3012 sends the IP address of the transfer apparatus that was identified at the step S113 and the session ID that corresponds to the agent ID that was received to the distribution apparatus 51 (step S115). The management apparatus 31 has a table (not illustrated in the figure) for storing the agent ID in association with the session ID, and uses this table to identify the session ID.

The transmitter 3012 transmits the IP address of the transfer apparatus that was identified at the step S113 and the received agent ID to each of the collection apparatuses 91 to 97 (step S117). At the step S117, the transmitter 3012 uses the IP address of the collection apparatus, which is stored in the collection management table 303, to transmit them. The processing at the step S117 has no meaning if it is carried out after an inquiry is received from a collection apparatus, so this processing is carried out before an inquiry is received from a collection apparatus.

The transmitter 3012 transmits a change complete notification that includes the IP address of the transfer apparatus that was identified at the step S113 to the transfer apparatus that was the transmission source of the allocation change request (step S119). The processing then ends.

By carrying out the processing such as described above, each collection apparatus can complete the processing without having to carry out an inquiry to the management apparatus 31 even when the collection apparatus is affected by the allocation change. Moreover, when an acquisition request is received from a collection apparatus after changing allocation, the transfer apparatus that is the transmission source of the allocation change request can send a notification of a new transmission destination of the acquisition request.

Figure 29:
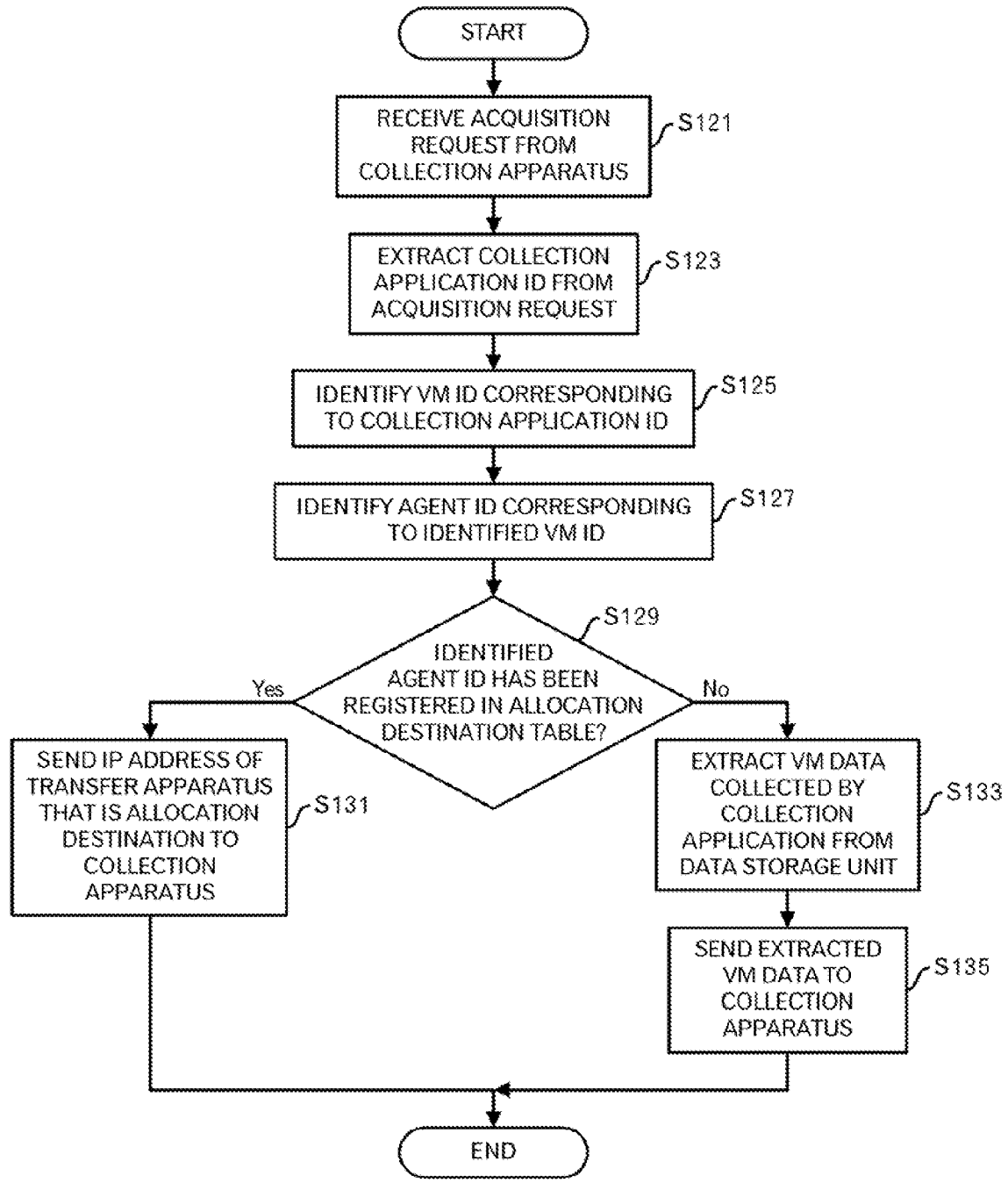
FIG. 29 is a diagram depicting a processing flow of a processing carried out when the transfer apparatus received an acquisition request from the collection application in the fourth embodiment.

Next, the processing that is carried out by the transfer apparatuses 11 to 17 when an acquisition request is received from one of the collection apparatuses 91 to 97 will be explained using FIG. 29.

First, when the transmitter 106 receives an acquisition request, which requests the acquisition of VM data, from one of the collection apparatuses 91 to 97, (FIG. 29: step S121), the transmitter 106 extracts the collection application ID from the acquisition request (step S123).

The transmitter 106 identifies, from the requesting VM table 110, the VM ID that was correlated with the collection application ID that was extracted at the step S123 (step S125). Moreover, the transmitter 106 identifies, from the allocated VM table 111, the agent ID that was correlated with the VM ID that was extracted at the step S125 (step S127).

The transmitter 106 determines whether or not the agent ID that was identified at the step S127 is registered in the allocation destination table 112 (step S129). When the identified agent ID is registered in the allocation destination table 112 (step S129: YES route), the transmitter 106 extracts the IP address of the transfer apparatus that is the allocation destination from the allocation destination table 112. Then, the transmitter 106 transmits the IP address of the transfer apparatus that is the allocation destination to the collection apparatus 91 that is the transmission source of the acquisition request. The processing then ends.

On the other hand, when the identified agent ID is not registered in the allocation destination table 112 (step S129: NO route), the transmitter 106 extracts the VM data that corresponds to the collection application ID that was extracted at the step S123 from the data storage unit 105 (step S133).

The transmitter 106 transmits the VM data that was extracted at the step S133 to the collection apparatus that is the transmission source of the acquisition request (step S135). The processing then ends.

By carrying out the processing such as described above, it is possible to notify the collection apparatus, from which an acquisition request was sent after an allocation change, of the IP address of the transfer apparatus that is the allocation destination. As a result, the collection apparatus can complete the processing without sending an inquiry to the management apparatus.

Embodiment 5

Next, a fifth embodiment will be explained. In this fifth embodiment, the processing by the management apparatus 31 is different from that in the fourth embodiment. The other portions are the same as in the fourth embodiment, so explanations of those portions are omitted.

Figure 30:
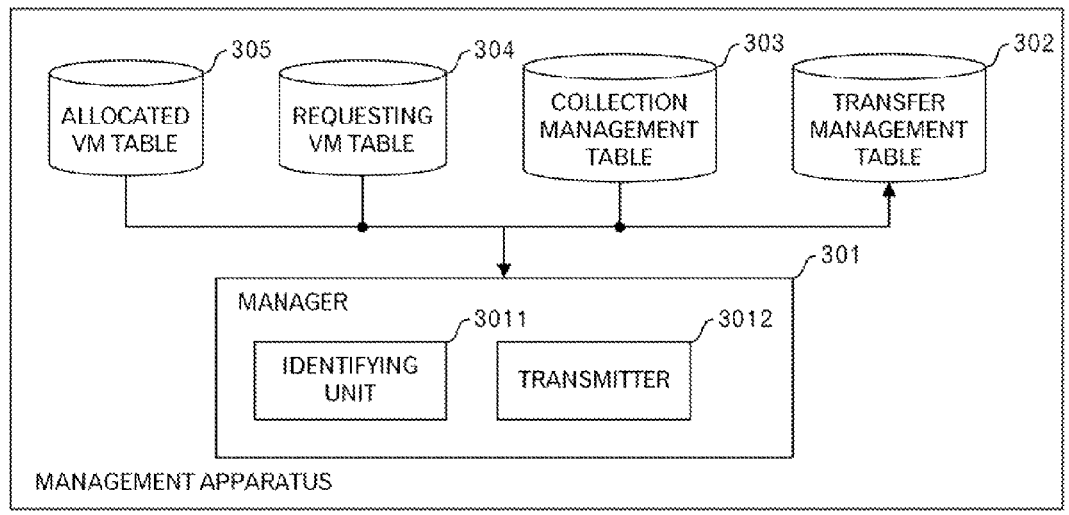
FIG. 30 is a functional block diagram of a management apparatus in a fifth embodiment.

FIG. 30 illustrates a functional block diagram of the management apparatus 31 in this fifth embodiment. In the example in FIG. 30, the management apparatus 31 includes a manager 301, a transfer management table 302, a collection management table 303, a requesting VM table 304 and an allocated VM table 305. The manager 301 uses data that is stored in the transfer management table 302 to carry out a processing to identify a transfer apparatus that is the allocation destination. The manager 301 also uses the data stored in the collection management table 303, the requesting VM table 304 and allocated VM table 305 to transmit the IP address of the transfer apparatus that is the allocation destination of the transfer processing to the collection apparatuses 91 to 97.

The same data that is stored in the requesting VM table 110 of the transfer apparatus is stored in the requesting VM table 304. Moreover, the same data as in the allocated VM table 111 of the transfer apparatus is stored in the allocated VM table 305.

Figure 31:
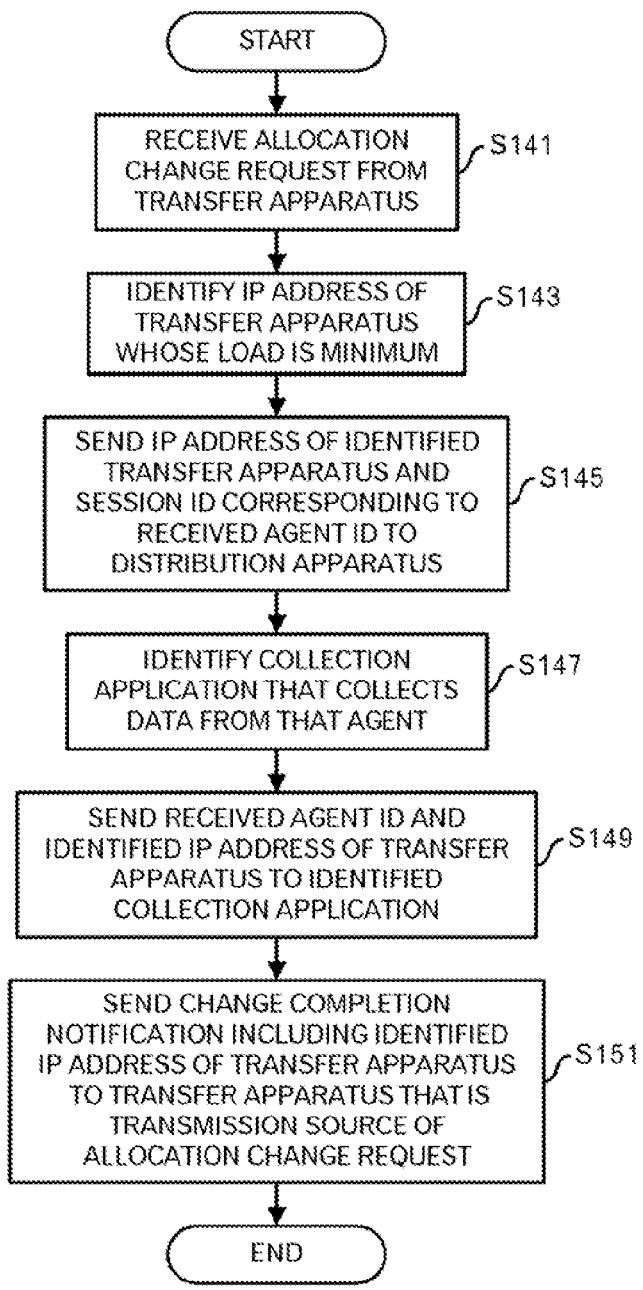
FIG. 31 is a diagram depicting a processing flow of a processing carried out by the management apparatus that received the allocation change request in the fifth embodiment.

Next, the processing that is carried out by the management apparatus 31 that received an allocation change request will be explained using FIG. 31. First, the identifying unit 3011 receives an allocation change request that includes the agent ID from the transfer apparatus, and stores that request in a storage device such as a memory (FIG. 31: step S141).

The identifying unit 3011 identifies, from the transfer management table 302, the IP address of the transfer apparatus (except for the transfer apparatus that is the transmission source of the allocation change request) that has the least load (step S143).

The transmitter 3012 transmits the IP address of the transfer apparatus that was identified at the step S143 and the session ID that corresponds to the received agent ID to the distribution apparatus 51 (step S145). The management apparatus 31 has a table (not illustrated in the figure) that stores the agent ID in association with session ID, and uses that table to identify the session ID.

The transmitter 3012 identifies the ID of the collection application that collects data from the agent of the received agent ID (step S147). At the step S147, first, the transmitter 3012 identifies, from the allocated VM table 305, the VM ID that corresponds to the received agent ID. Then, the transmitter 3012 identifies, from the requesting VM table 304, the collection application ID that corresponds to the identified VM ID.

The transmitter 3012 transmits the IP address of the transfer apparatus that was identified at the step S143 and the received agent ID to the collection apparatus of the collection application ID that was identified at the step S147 (step S149). At the step S147, the transmitter 3012 extracts the IP address of the collection apparatus that corresponds to the collection application ID that was identified at the step S147 from the collection management table 303, and carries out the processing using the extracted IP address. The processing of the step S149 has no meaning if it is carried out after an inquiry has been received from a collection apparatus, so it is carried out before receiving an inquiry from a collection apparatus.

The transmitter 3012 transmits a change complete notification that includes the IP address of the transfer apparatus that was identified at the step S143 to the transfer apparatus that is the transmission source of the allocation change request (step S151). The processing then ends.

By carrying out the aforementioned processing, the collection apparatus that is affected by the allocation change do not have to conduct the inquiries for the management apparatus. Moreover, when the acquisition request is received from the collection apparatus after the allocation change, the transfer apparatus that is the transmission source of the allocation change request can notify a new transmission destination of the acquisition request.

Although embodiments of this technique were explained, this technique is not limited to those. For example, the functional block diagrams of the transfer apparatuses 11 to 17, management apparatus 31, distribution apparatus 51, service apparatuses 71 to 77, and collection apparatuses 91 to 97, which were explained above, do not always correspond to program module configurations.

Moreover, the structures of the respective tables explained above are mere examples, and may be changed variously. Furthermore, as for the processing flow, as long as the processing results do not change, the order of the steps may be exchanged or plural steps may be executed in parallel.

In addition, although the system in which the VM data is transmitted was explained as one example, the system is not limited to that. For example, the embodiments may be applied to a system in which weather data obtained by a sensor is transmitted.

Moreover, two networks (i.e. networks 20 and 40) were included in the aforementioned system, however, the aforementioned system may be configured on one network.

Moreover, the functions of the management apparatus 31 and distribution apparatus 51 may be realized by plural information processing apparatuses (i.e. computers), instead of one computer.

Figure 32:
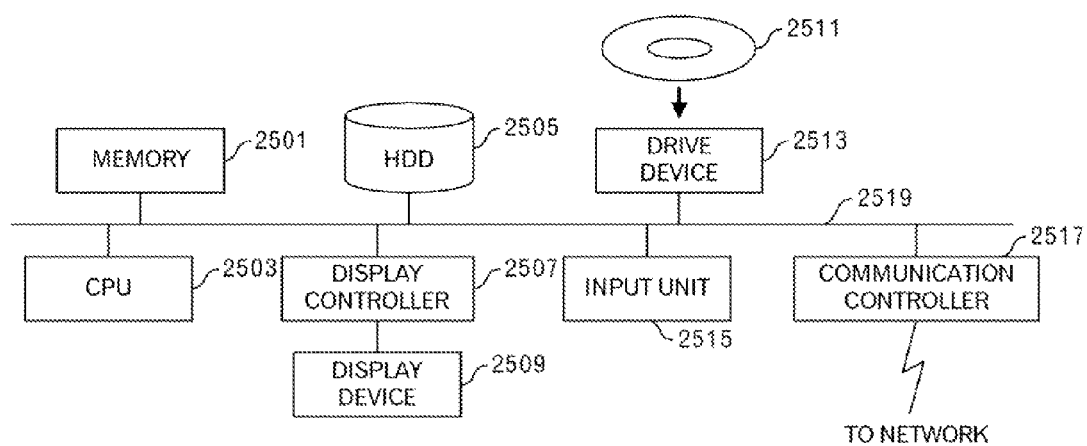
FIG. 32 is a functional block diagram of a computer.

In addition, the aforementioned transfer apparatuses 11 to 17, management apparatus 31, distribution apparatus 51, service apparatuses 71 to 77 and collection apparatuses 91 to 97 are computer devices as shown in FIG. 32. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 32. An operating system (OS) and an application program for carrying out the foregoing processing in the embodiment, are stored in the HDD 2505, and when executed by the CPU 2503, they are read out from the HDD 2505 to the memory 2501. An operating system (OS) and an application program for carrying out the foregoing processing in the embodiment, are stored in the HDD 2505, and when executed by the CPU 2503, they are read out from the HDD 2505 to the memory 2501. In addition, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The embodiments described above are summarized as follows:

An information processing system relating to a first aspect of the embodiments includes: (A) a plurality of transfer apparatuses, each of which carries out a transfer processing to transmit data received from one or plural first processing apparatuses to one or plural second processing apparatuses in response to a request from the one or plural second processing apparatuses; and (B) a management apparatus managing allocation of the transfer processing for the plurality of transfer apparatuses. Then, each transfer apparatus of the plurality of transfer apparatuses includes: (a1) a determination unit to determine whether a value of a load caused by the transfer processing carried out by the transfer apparatus exceeds a first threshold, and upon determining that the value of the load exceeds the first threshold, to count, for each first processing apparatus of the one or plural first processing apparatuses, the number of second processing apparatuses that request data transmitted by the first processing apparatus; (a2) a first identifying unit to identify a first processing apparatus that is a transmission source of data transferred in the transfer processing to be allocated to another transfer apparatus among the plurality of transfer apparatuses, based on the counted number; and (a3) a first transmitter to transmit a change request requesting that the transfer processing of data transmitted by the identified first processing apparatus is to be allocated to the another transfer apparatus among the plurality of transfer apparatuses, to the management apparatus. Moreover, the management apparatus includes: (b1) a second identifying unit to identify, upon receipt of the change request, from among the plurality of transfer apparatuses, another transfer apparatus that will carry out the transfer processing of the data transmitted by the identified first processing apparatus on behalf of a transfer apparatus that is a transmission source of the change request; and (b2) a second transmitter to transmit, upon receipt of an inquiry about a request destination of the data transmitted by the identified first processing apparatus from a second processing apparatus that requests the data, identification information of the identified another transfer apparatus to the second processing apparatus.

As described above, the second processing apparatus inquires the transfer apparatus that is a request destination of the data transmitted by the identified first processing apparatus to the management apparatus. Therefore, when a first processing apparatus that is a transmission source apparatus and whose number of second processing apparatuses that requests data is identified, it is presumed that the processing load of the management apparatus becomes high. Then, by paying attention to the number of second processing apparatuses and selecting the first processing apparatus so as to reduce the number of second processing apparatuses, the processing load of the management apparatus can be reduced.

Moreover, the aforementioned first identifying unit may identify a first processing apparatus whose counted number is minimum among the one or plural first processing apparatuses. Thus, the number of inquiries about the request destination can be effectively reduced.

Furthermore, the aforementioned first identifying unit may use a data storage unit storing, for each first processing apparatus of the one or plural first processing apparatuses, a value of a load caused by the transfer processing of data transmitted by the first processing apparatus, to identify one or a plurality of first processing apparatuses that are transmission sources of data transferred in the transfer processing to be allocated to another transfer apparatus of the plurality of transfer apparatuses from among the one or plural first processing apparatuses so that a total of the values of the loads is equal to or less than a second threshold value and a total of the counted numbers is minimum. By doing so, the load balance can be appropriately carried out among the plural transfer apparatuses, and it becomes possible to suppress the load caused by handling the inquiries by the management apparatus.

In addition, the aforementioned first identifying unit may use a data storage unit storing, for each first processing apparatus of the one or plural first processing apparatuses, a value of a load caused by the transfer processing of data transmitted by the first processing apparatus, and a value representing a size of a load fluctuation caused by the transfer processing of the data transmitted by the first processing apparatus, to identify one or a plurality of first processing apparatuses that are transmission sources of data transferred in the transfer processing to be allocated to another transfer apparatus of the plurality of transfer apparatuses from among first processing apparatuses whose value representing the size of the load fluctuation is equal to or less than a third threshold among the one or plural first processing apparatuses so that the total of the values of the loads is equal to or less than the second threshold value and the total of the counted numbers is minimum. When the fluctuation of the load caused by the transfer processing for which the allocation will be changed is large, the load in the transfer apparatus that is the allocation destination may become unstable. Then, by changing the allocation taking into account the size of the fluctuation of the load caused by the transfer processing, it becomes possible to carry out the load balance, appropriately.

Moreover, the aforementioned second transmitter may transmit, before receiving the inquiry about the requesting destination of the data transmitted by the identified first processing apparatus, identification information of the identified another transfer apparatus to each of the one or plural second processing apparatuses. Thus, when the identification information of the identified another transfer apparatus can be transmitted to each of the second processing apparatuses, it can be omitted to handle the inquiries about the request destination.

Furthermore, the aforementioned second transmitter may identify a second processing apparatus that requests the data transmitted by the identified first processing apparatus before receiving the inquiry about the requesting destination of the data transmitted by the identified first processing apparatus, by using data to manage a relationship between a first processing apparatus and a second processing apparatus that requests data transmitted by the identified first processing apparatus, and may transmit the identification information of the identified another transfer apparatus to the second processing apparatus. By doing so, when the identification information of the identified another transfer apparatus can be transmitted beforehand to the second processing apparatus that may transmit the inquiry about the request destination, it is possible to omit handling of the inquiry about the request destination.

Moreover, the aforementioned second transmitter may transmit the identification information of the identified another transfer apparatus to a transfer apparatus that is a transmission source of the change request. Thus, the transfer apparatus that is the transmission source of the change request can notify the second processing apparatuses that request data transmitted by the identified first processing apparatus of the new request destination.

Furthermore, the aforementioned second identifying unit may identify another transfer apparatus that carries out the transfer processing of the data transmitted by the identified first processing apparatus on behalf of a transfer apparatus that is the transmission source of the change request, based on a value of a processing load of the plurality of transfer apparatuses. By doing so, it becomes possible to identify another transfer apparatus so as to distribute the processing load among the plural transfer apparatuses.

An information processing method relating to a second aspect of the embodiments includes: (C) determining whether a value of a load caused by a transfer processing to transmit data received from one or plural first processing apparatuses to one or plural second processing apparatuses in response to a request from the one or plural second processing apparatuses exceeds a first threshold; (D) upon determining that the value of the load exceeds the first threshold, counting, for each first processing apparatus of the one or plural first processing apparatuses, the number of second processing apparatuses that request data transmitted by the first processing apparatus; (E) identifying a first processing apparatus that is a transmission source of data transferred in the transfer processing to be allocated to another transfer apparatus among a plurality of transfer apparatuses, based on the counted number; and (F) transmitting a change request requesting that the transfer processing of data transmitted by the identified first processing apparatus is to be allocated to the another transfer apparatus among the plurality of transfer apparatuses, to a management apparatus managing allocation of the transfer processing for the plurality of transfer apparatuses.

When the allocation of the transfer processing is changed, the second processing apparatus that requests data transmitted by the identified first processing apparatus does not know the transfer apparatus that is the request destination of that data. Therefore, a processing for handling an inquiry from the second processing apparatus that requests that data is carried out. Therefore, when the first processing apparatus that is the transmission source and whose number of second processing apparatuses that request the data is identified, it is assumed that the load caused by a processing to cope with the second processing apparatus increases. Then, when the first processing apparatus is selected so as to decrease the number of second processing apparatuses by paying attention to the number of second processing apparatuses, the load caused by the processing to cope with the second processing apparatus can be reduced.

An information processing method relating to a third aspect of the embodiments includes: (G) upon receiving, from one transfer apparatus of a plurality of transfer apparatuses that carry out a transfer processing, a change request requesting that a first transfer processing that is allocated to the one transfer apparatus is to be allocated to another transfer apparatus among the plurality of transfer apparatuses, identifying, from among the plurality of transfer apparatuses, another transfer apparatus that will carry out the first transfer processing on behalf of a transfer apparatus that is a transmission source of the change request; and (H) upon receipt of an inquiry about a request destination of data transmitted in the first transfer processing from a processing apparatus that requests the data, transmitting identification information of the identified another transfer apparatus to the processing apparatus.

By doing so, even after the change of the allocation of the transfer processing, it becomes possible for the processing apparatus that is affected by the change to obtain data from the new request destination.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing system, comprising:
a plurality of transfer apparatuses, each of which carries out a transfer processing to transmit data received from one or plural first processing apparatuses to one or plural second processing apparatuses in response to a request from the one or plural second processing apparatuses; and
a management apparatus managing allocation of the transfer processing for the plurality of transfer apparatuses, and
wherein each transfer apparatus of the plurality of transfer apparatuses comprises:
a first memory; and
a first processor configured to use the first memory to execute a first process, the first process comprising:
determining whether a value of a load caused by the transfer processing carried out by the transfer apparatus exceeds a first threshold;
upon determining that the value of the load exceeds the first threshold, counting, for each first processing apparatus of the one or plural first processing apparatuses, the number of second processing apparatuses that request data transmitted by the first processing apparatus;
by using a data storage unit storing, for each first processing apparatus of the one or plural first processing apparatuses, a value of a load caused by the transfer processing of data transmitted by the first processing apparatus, and a value representing a size of a load fluctuation caused by the transfer processing of the data transmitted by the first processing apparatus, first identifying a first processing apparatus that is a transmission source of data transferred in the transfer processing to be allocated to another transfer apparatus among the plurality of transfer apparatuses from among first processing apparatuses whose value representing the size of the load fluctuation is equal to or less than a third threshold among the one or plural first processing apparatuses so that the total of the values of the loads is equal to or less than the second threshold value and the total of the counted numbers is minimum; and
first transmitting a change request requesting that the transfer processing of data transmitted by the identified first processing apparatus is to be allocated to the another transfer apparatus among the plurality of transfer apparatuses, to the management apparatus,
wherein the management apparatus comprising:
a second memory; and
a second processor configured to use the second memory to execute a second process, the second process comprising:
upon receipt of the change request, second identifying, from among the plurality of transfer apparatuses, another transfer apparatus that will carry out the transfer processing of the data transmitted by the identified first processing apparatus on behalf of a transfer apparatus that is a transmission source of the change request; and
upon receipt of an inquiry about a request destination of the data transmitted by the identified first processing apparatus from a second processing apparatus that requests the data, second transmitting identification information of the identified another transfer apparatus to the second processing apparatus.

2. The information processing system as set forth in claim 1, wherein the second transmitting comprises:
before receiving the inquiry about the requesting destination of the data transmitted by the identified first processing apparatus, transmitting identification information of the identified another transfer apparatus to each of the one or plural second processing apparatuses.

3. The information processing system as set forth in claim 2, wherein the second transmitting comprises:
before receiving the inquiry about the requesting destination of the data transmitted by the identified first processing apparatus, by using data to manage a relationship between a first processing apparatus and a second processing apparatus that requests data transmitted by the identified first processing apparatus, identifying a second processing apparatus that requests the data transmitted by the identified first processing apparatus, and transmitting the identification information of the identified another transfer apparatus to the second processing apparatus.

4. The information processing system as set forth in claim 1, wherein the second transmitting comprises:
transmitting the identification information of the identified another transfer apparatus to a transfer apparatus that is a transmission source of the change request.

5. The information processing system as set forth in claim 1, wherein the second identifying comprises:
identifying another transfer apparatus that carries out the transfer processing of the data transmitted by the identified first processing apparatus on behalf of a transfer apparatus that is the transmission source of the change request, based on a value of a processing load of the plurality of transfer apparatuses.

6. A transfer apparatus, comprising:
a memory; and
a processor configured to use the first memory to execute a process, the process comprising:
determining whether a value of a load caused by a transfer processing to transmit data received from one or plural first processing apparatuses to one or plural second processing apparatuses in response to a request from the one or plural second processing apparatuses exceeds a first threshold;
upon determining that the value of the load exceeds the first threshold, counting, for each first processing apparatus of the one or plural first processing apparatuses, the number of second processing apparatuses that request data transmitted by the first processing apparatus;
by using a data storage unit storing, for each first processing apparatus of the one or plural first processing apparatuses, a value of a load caused by the transfer processing of data transmitted by the first processing apparatus, and a value representing a size of a load fluctuation caused by the transfer processing of the data transmitted by the first processing apparatus, identifying a first processing apparatus that is a transmission source of data transferred in the transfer processing to be allocated to another transfer apparatus among a plurality of transfer apparatuses from among first processing apparatuses whose value representing the size of the load fluctuation is equal to or less than a third threshold among the one or plural first processing apparatuses so that the total of the values of the loads is equal to or less than the second threshold value and the total of the counted numbers is minimum; and transmitting a change request requesting that the transfer processing of data transmitted by the identified first processing apparatus is to be allocated to the another transfer apparatus among the plurality of transfer apparatuses, to a management apparatus managing allocation of the transfer processing for the plurality of transfer apparatuses.

7. An information processing method, comprising:

determining, by using a computer, whether a value of a load caused by a transfer processing to transmit data received from one or plural first processing apparatuses to one or plural second processing apparatuses in response to a request from the one or plural second processing apparatuses exceeds a first threshold;

upon determining that the value of the load exceeds the first threshold, counting, by using the computer, for each first processing apparatus of the one or plural first processing apparatuses, the number of second processing apparatuses that request data transmitted by the first processing apparatus;

by using a data storage unit storing, for each first processing apparatus of the one or plural first processing apparatuses, a value of a load caused by the transfer processing of data transmitted by the first processing apparatus, and a value representing a size of a load fluctuation caused by the transfer processing of the data transmitted by the first processing apparatus, identifying, by using the computer, a first processing apparatus that is a transmission source of data transferred in the transfer processing to be allocated to another transfer apparatus among a plurality of transfer apparatuses from among first processing apparatuses whose value representing the size of the load fluctuation is equal to or less than a third threshold among the one or plural first processing apparatuses so that the total of the values of the loads is equal to or less than the second threshold value and the total of the counted numbers is minimum; and transmitting, by using the computer, a change request requesting that the transfer processing of data transmitted by the identified first processing apparatus is to be allocated to the another transfer apparatus among the plurality of transfer apparatuses, to a management apparatus managing allocation of the transfer processing for the plurality of transfer apparatuses.

8. A computer-readable, non-transitory storage medium storing a program for causing a computer to execute a process, the process comprising:

determining whether a value of a load caused by a transfer processing to transmit data received from one or plural first processing apparatuses to one or plural second processing apparatuses in response to a request from the one or plural second processing apparatuses exceeds a first threshold;

upon determining that the value of the load exceeds the first threshold, counting, for each first processing apparatus of the one or plural first processing apparatuses, the number of second processing apparatuses that request data transmitted by the first processing apparatus;

by using a data storage unit storing, for each first processing apparatus of the one or plural first processing apparatuses, a value of a load caused by the transfer processing of data transmitted by the first processing apparatus, and a value representing a size of a load fluctuation caused by the transfer processing of the data transmitted by the first processing apparatus, identifying a first processing apparatus that is a transmission source of data transferred in the transfer processing to be allocated to another transfer apparatus among a plurality of transfer apparatuses from among first processing apparatuses whose value representing the size of the load fluctuation is equal to or less than a third threshold among the one or plural first processing apparatuses so that the total of the values of the loads is equal to or less than the second threshold value and the total of the counted numbers is minimum; and transmitting a change request requesting that the transfer processing of data transmitted by the identified first processing apparatus is to be allocated to the another transfer apparatus among the plurality of transfer apparatuses, to a management apparatus managing allocation of the transfer processing for the plurality of transfer apparatuses.

\* \* \* \* \*